（12）United States Patent
Matsubuchi et al.

(10) Patent No.: US 11,300,155 B2
(45) Date of Patent: Apr. 12, 2022

(54) CAGE FOR A TAPERED ROLLER BEARING AND TAPERED ROLLER BEARING

(71) Applicant: NTN Corporation, Osaka (JP)

(72) Inventors: Hiroki Matsubuchi, Shizuoka (JP); Takashi Kawai, Shizuoka (JP); Takanori Ishikawa, Shizuoka (JP); Yasuhito Fujikake, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/969,837

(22) PCT Filed: Feb. 20, 2019

(86) PCT No.: PCT/JP2019/006245
§ 371 (c)(1),
(2) Date: Aug. 13, 2020

(87) PCT Pub. No.: WO2019/163809
PCT Pub. Date: Aug. 29, 2019

(65) Prior Publication Data
US 2020/0378437 A1 Dec. 3, 2020

(30) Foreign Application Priority Data

Feb. 21, 2018 (JP) .............................. JP2018-028976
Nov. 1, 2018 (JP) .............................. JP2018-206639

(51) Int. Cl.
*F16C 19/36* (2006.01)
*F16C 33/46* (2006.01)
*F16C 33/66* (2006.01)

(52) U.S. Cl.
CPC ........ *F16C 19/364* (2013.01); *F16C 33/4623* (2013.01); *F16C 33/4635* (2013.01);
(Continued)

(58) Field of Classification Search
CPC ................ F16C 19/364; F16C 33/4623; F16C 33/4635; F16C 33/4676; F16C 33/4682;
(Continued)

(56) References Cited

U.S. PATENT DOCUMENTS

| | | | | | |
|---|---|---|---|---|---|
| 6,135,643 | A | * | 10/2000 | Hattori | B60B 27/001 384/539 |
| 9,267,543 | B2 | * | 2/2016 | Suzuki | F16C 33/6651 |
| 10,001,171 | B2 | * | 6/2018 | Murata | F16C 33/6681 |
| 2007/0014501 | A1 | | 1/2007 | Ueno et al. | |

(Continued)

FOREIGN PATENT DOCUMENTS

| CN | 201902452 U | * | 7/2011 | ............ F16C 33/467 |
|---|---|---|---|---|
| DE | 112009001651 T5 | * | 4/2011 | .......... F16C 33/6681 |

(Continued)

OTHER PUBLICATIONS

International Search Report dated May 28, 2019 in International (PCT) Application No. PCT/JP2019/006245.

(Continued)

*Primary Examiner* — Marcus Charles
(74) *Attorney, Agent, or Firm* — Wenderoth, Lind & Ponack, L.L.P.

(57) ABSTRACT

A cage for a tapered roller bearing includes a large-diameter-side annular portion circumferentially extending along large end surfaces of a plurality of tapered rollers; a small-diameter-side annular portion circumferentially extending along small end surfaces of the tapered rollers; and a plurality of pillars coupling together the large-diameter-side annular portion and the small-diameter-side annular portion. The large-diameter-side annular portion has large-diameter-side pocket surfaces opposed to the large end surfaces of the respective tapered rollers. The large-diameter-side pocket surfaces include oil retaining holes including blind holes, and being configured to receive and retain lubricating oil by capillary action.

20 Claims, 18 Drawing Sheets

(52) U.S. Cl.
CPC ...... *F16C 33/6651* (2013.01); *F16C 33/4676* (2013.01); *F16C 33/6681* (2013.01); *F16C 2208/00* (2013.01); *F16C 2240/30* (2013.01); *F16C 2240/44* (2013.01); *F16C 2240/70* (2013.01); *F16C 2361/61* (2013.01)

(58) Field of Classification Search
CPC .............. F16C 33/6651; F16C 33/6681; F16C 2208/00; F16C 2226/36; F16C 2240/30; F16C 2240/44; F16C 2240/46; F16C 2240/70; F16C 2361/61
USPC ........ 384/470, 467, 523, 571–572, 576, 579
See application file for complete search history.

(56) References Cited

U.S. PATENT DOCUMENTS

| | | | |
|---|---|---|---|
| 2012/0263405 A1 | 10/2012 | Mizuki et al. | |
| 2015/0275974 A1 | 10/2015 | Suzuki | |
| 2018/0245627 A1 | 8/2018 | Kawai | |

FOREIGN PATENT DOCUMENTS

| | | | | |
|---|---|---|---|---|
| DE | 102009055660 A1 | * | 5/2011 | .......... F16C 33/4617 |
| JP | S5988514 U | * | 6/1984 | .......... F16C 33/4635 |
| JP | 8-200376 | | 8/1996 | |
| JP | 08200376 A | * | 8/1996 | .............. F16C 33/46 |
| JP | H09203414 A | * | 8/1997 | ............ F16C 33/467 |
| JP | 2005-83554 | | 3/2005 | |
| JP | 2007-24168 | | 2/2007 | |
| JP | 2007-32612 | | 2/2007 | |
| JP | 2008-14428 | | 1/2008 | |
| JP | 2008-164062 | | 7/2008 | |
| JP | 2010-71321 | | 4/2010 | |
| JP | 2015-183804 | | 10/2015 | |
| JP | 2015203436 A | * | 11/2015 | ............ F16C 19/364 |
| JP | 2017-25931 | | 2/2017 | |
| JP | 2017166641 A | * | 9/2017 | .............. F16C 19/36 |
| JP | 2018165565 A | * | 10/2018 | .............. F16C 33/66 |
| JP | 2018168861 A | * | 11/2018 | .............. F16C 33/46 |
| WO | 2011/062188 | | 5/2011 | |
| WO | 2017/033977 | | 3/2017 | |
| WO | WO-2018186346 A1 | * | 10/2018 | .............. F16C 33/66 |

OTHER PUBLICATIONS

International Preliminary Report on Patentability dated Aug. 27, 2020 in International (PCT) Application No. PCT/JP2019/006245.

* cited by examiner

CAGE FOR A TAPERED ROLLER BEARING AND TAPERED ROLLER BEARING

TECHNICAL FIELD

The present invention relates to a cage for a tapered roller bearing and a tapered roller bearing using the cage.

BACKGROUND ART

Tapered roller bearings, capable of supporting radial and axial loads at the same time, are frequently used in automotive transmissions and differential mechanisms (see, e.g., the below-identified Patent Document 1).

The tapered roller bearing of Patent Document 1 includes an outer ring having a conical outer ring raceway surface on its inner periphery; an inner ring having, on its outer periphery, a conical inner ring raceway surface located radially inwardly of, and, opposed to, the outer ring raceway surface; a plurality of tapered rollers disposed between the outer ring raceway surface and the inner ring raceway surface so as to be circumferentially spaced apart from each other; and an annular cage keeping the circumferential distances between the tapered rollers. The inner ring includes, on its outer periphery, a large flange for guiding the large end surfaces of the tapered rollers. During rotation of the bearing, the large end surfaces of the tapered rollers and the large flange of the inner ring partially support the axial load by coming into sliding contact with each other, thereby partially supporting the axial load.

The above tapered roller bearing is lubricated by, for example, a splashing lubrication method in which a bearing is lubricated by droplets of lubricating oil splashed due to rotation of gears; a pressure-feeding lubrication method in which lubricating oil pressure-fed from an oil pump is directly supplied to a bearing; or an oil bath lubrication method in which a bearing is used while being partially immersed in lubricating oil stored in an oil bath. While the tapered roller bearing is rotating, lubricating oil is continuously supplied to the bearing from the outside, but, while the tapered roller bearing is stopped, lubricating oil is not supplied to the bearing from the outside. Therefore, when the tapered roller bearing is stopped for a long time, most of the lubricating oil adhering to the bearing flows away, and, when the tapered roller bearing is started thereafter, the bearing is less likely to be sufficiently lubricated.

Especially in recent years, in order to reduce energy loss caused by the stirring resistance of lubricating oil, there is a growing tendency to use low-viscosity lubricating oil, or reduce the amount of lubricating oil, in automotive transmissions or differential mechanisms. Therefore, when a tapered roller bearing used therein is stopped for a long time, the amount of lubricating oil remaining in the tapered roller bearing tends to decrease to an insufficient level, and thus, when the tapered roller bearing is started thereafter, the temperature of the bearing between the large end surfaces of the tapered rollers and the large flange of the inner ring may rise sharply.

Especially if, as disclosed in Patent Document 1, the amount of lubricating oil flowing into the tapered roller bearing is reduced (e.g., by reducing the size of the gap between the cage and the small flange of the inner ring) in order to reduce the torque loss of the bearing due to the stirring resistance of lubricating oil present in the bearing, when the tapered roller bearing is stopped for a long time, the amount of lubricating oil remaining in the tapered roller bearing also tends to decrease to an insufficient level, and thus, when the tapered roller bearing is started thereafter, the temperature of the bearing between the large end surfaces of the tapered rollers and the large flange of the inner ring may rise sharply.

PRIOR ART DOCUMENT(S)

Patent Document(s)

Patent Document 1: Japanese Unexamined Patent Application Publication No, 2007-024168
Patent Document 2: PCT International Publication No. 2011/062188

SUMMARY OF THE INVENTION

Problems to be Solved by the Invention

Patent Document 2 discloses a tapered roller bearing in which lubrication is provided between the large end surfaces of the tapered rollers and the large flange of the inner ring even when the supply of lubricating oil to the bearing from the outside stops. The cage of the tapered roller bearing of Patent Document 2 includes a large-diameter-side annular portion circumferentially extending along the large end surfaces of the tapered rollers; a small-diameter-side annular portion circumferentially extending along the small end surfaces of the tapered rollers; and a plurality of pillars coupling together the large-diameter-side annular portion and the small-diameter-side annular portion. The large-diameter-side annular portion has a plurality of oil retaining recesses formed in its inner periphery so as to be circumferentially spaced apart from each other.

In the tapered roller bearing of Patent Document 2, while lubricating oil is continuously supplied to the tapered roller bearing from the outside, the lubricating oil is partially stored in the oil retaining recesses in the inner periphery of the large-diameter-side annular portion of the cage, and, when the supply of lubricating oil to the tapered roller bearing from the outside stops for some reason thereafter, lubrication is provided between the large end surfaces of the tapered rollers and the large flange of the inner ring by lubricating oil flowing out of the oil retaining recesses of the large-diameter-side annular portion.

The inventors of the present application considered, as in Patent Document 2, forming, in the inner periphery of the large-diameter-side annular portion of the cage, a plurality of oil retaining recesses for storing lubricating oil so as to be circumferentially spaced apart from each other, in order to avoid insufficient lubrication between the large end surfaces of the tapered rollers and the large flange of the inner ring when the tapered roller bearing is started after having been stopped for a long time.

That is, the inventors thought that, by forming a plurality of oil retaining recesses for storing lubricating oil in the inner periphery of the large-diameter-side annular portion of the cage so as to be circumferentially spaced apart from each other, when the tapered roller bearing is started after having been stopped for a long time, lubricating oil stored in the oil retaining recesses should prevent insufficient lubrication between the large end surfaces of the tapered rollers and the large flange of the inner ring.

However, even if a plurality of oil retaining recesses for storing lubricating oil are formed in the inner periphery of the large-diameter-side annular portion of the cage so as to be circumferentially spaced apart from each other, there is the following problem: That is, if the tapered roller bearing is positioned such that its rotation axis extends horizontally, while the tapered roller bearing is stopped, of all the oil retaining recesses that are formed in the inner periphery of the large-diameter-side annular portion of the cage, lubricating oil is retained only within the lower ¼ or so of them (which open upwardly). Since the remaining ¾ or so of the oil retaining recesses are open horizontally or downwardly, lubricating oil in these oil retaining recesses falls by gravity, and cannot be retained within these oil retaining recesses.

Therefore, when the tapered roller bearing is started after having been stopped for a long time, although lubrication is provided between the large flange of the inner ring and the large end surfaces of ¼ or so of all the tapered rollers by lubricating oil stored in the ¼ or so of the oil retaining recesses, lubrication is not provided between the large flange of the inner ring and the large end surfaces of the remaining ¾ or so of the tapered rollers. As a result, the temperature of the bearing between the large end surfaces of the tapered rollers and the large flange of the inner ring may rise sharply.

It is an object of the present invention to provide a cage for use in a tapered roller bearing, which shows excellent seizure resistance between the large end surfaces of the tapered rollers and the large flange of the inner ring when the tapered roller bearing is started after having been stopped for a long time.

Means for Solving the Problems

In order to achieve the above object, the present invention provides a cage for a tapered roller bearing, the cage comprising: a large-diameter-side annular portion circumferentially extending along large end surfaces of a plurality of tapered rollers; a small-diameter-side annular portion circumferentially extending along small end surfaces of the tapered rollers; and a plurality of pillars coupling together the large-diameter-side annular portion and the small-diameter-side annular portion, wherein the large-diameter-side annular portion, the small-diameter-side annular portion and the pillars define a plurality of pockets in which the respective tapered rollers are received, and wherein the large-diameter-side annular portion has large-diameter-side pocket surfaces formed thereon so as to be opposed to the large end surfaces of the respective tapered rollers, characterized in that the large-diameter-side pocket surfaces have oil retaining holes formed therein, the oil retaining holes comprising blind holes, and configured such that lubricating oil is introduced into and retained in the oil retaining holes by capillary action.

With this arrangement, while the tapered roller bearing is rotating, lubricating oil is introduced into the oil retaining holes by capillary action, and when the tapered roller bearing is stopped thereafter, the lubricating oil in the oil retaining holes is retained therein by capillary action without falling out of the oil retaining holes by gravity. When the tapered roller bearing is started thereafter, the lubricating oil in the oil retaining holes flows out of the oil retaining holes, and is supplied to the large end surfaces of the tapered rollers by centrifugal force. This effectively increases the seizure resistance between the large end surfaces of the tapered rollers and the large flange of the inner ring when the tapered roller bearing is started after having been stopped for a long time.

The oil retaining holes each preferably has, on an inner surface of the oil retaining hole, a portion facing radially inwardly of the cage, and inclined radially outwardly of the cage toward the large end surface of a corresponding one of the tapered rollers.

With this arrangement, when the tapered roller bearing is started, lubricating oil in the oil retaining holes flows, along the inclined inner surface portions of the oil retaining holes, toward the large end surfaces of the tapered rollers by centrifugal force, thus effectively lubricating the large end surfaces of the tapered rollers.

The oil retaining holes each preferably has, on the inner surface of the oil retaining hole, a portion facing radially outwardly of the cage, and inclined radially inwardly of the cage toward the large end surface of the corresponding one of the tapered rollers.

With this arrangement, it is possible to increase the volume of lubricating oil retained in the oil retaining holes, and thus to effectively lubricate the large end surfaces of the tapered rollers.

Each of the oil retaining holes is preferably tapered such that a width of the oil retaining hole between inner surface portions of the oil retaining hole opposed to each other in a circumferential direction of the cage gradually increases toward the large end surface of the corresponding one of the tapered rollers.

With this arrangement, it is possible to increase the volume of lubricating oil retained in the oil retaining holes, and thus to effectively lubricate the large end surfaces of the tapered rollers.

Each of the oil retaining holes is preferably disposed such that, when seen in an axial direction of the corresponding one of the tapered rollers, a portion of an opening of the oil retaining hole that accounts for 50% or more of an area of the entire opening is aligned with the large end surface of the corresponding one of the tapered rollers.

With this arrangement, when the tapered roller bearing is started after having been stopped for a long time, it is possible to efficiently supply lubricating oil retained in the oil retaining holes to the large end surfaces of the tapered rollers with a minimum loss of lubricating oil.

Of all the oil retaining holes, two oil retaining holes are preferably formed in each of the large-diameter-side pocket surfaces so as to be spaced apart from a center of the large-diameter side pocket surface to opposite sides of the center in a circumferential direction of the cage.

With this arrangement, while ensuring the strength of the large-diameter-side annular portion of the cage, it is possible to efficiently lubricate the radially outer portions of the large end surfaces of the tapered rollers (i.e., the portions of the large end surfaces which partially support the axial load by coming into sliding contact with the large flange of the inner ring during rotation of the bearing).

An opening of each of the two oil retaining holes in each of the large-diameter-side pocket surfaces has a first width in the circumferential direction of the cage, and an unopen section between the two oil retaining holes has a second width in the circumferential direction of the cage, and the first width is preferably equal to or larger than the second width.

With this arrangement, it is possible to increase the volume of lubricating oil retained in the oil retaining holes, thus effectively lubricating the large end surfaces of the tapered rollers, while minimizing the strength decrease of the cage by the provision of the unopen sections between the respective pairs of oil retaining holes.

It is preferable that the large-diameter-side annular portion, the small-diameter-side annular portion, and the pillars are integrally formed of a resin by resin molding during which a weld line or lines form where flows of resin and that the weld line or each of the weld lines is located on the unopen section between the two oil retaining holes in one of the large-diameter-side pocket surfaces.

In this way, it is possible to effectively minimize the strength decrease of the cage caused by forming the oil retaining holes, and thus to keep the cage substantially equal in strength to conventional cages.

Also the following structure is preferably used: Each of the pillars has roller guiding surfaces each configured to guide a conical outer peripheral surface of one of the tapered rollers, and an oil groove is formed to extend through each of the roller guiding surfaces in an axial direction of the cage such that one of two ends thereof in the axial direction of the cage opens to an outer, in a radial direction of the cage, surface of the pillar, and the other of the two ends thereof opens to an inner, in the radial direction of the cage, surface of the pillar.

With this arrangement, during rotation of the tapered roller bearing, lubricating oil flowing the small diameter sides of the tapered rollers toward the large diameter sides thereof while passing through a space radially outward of the cage partially flows through the oil grooves in the roller guiding surfaces of the pillars into the space radially inward of the cage, and thus is used to lubricate the large flange of the inner ring. Also, since lubricating oil remains in the oil grooves of the roller guiding surfaces when the bearing is stopped, when the tapered roller bearing is started thereafter, sufficient amounts of lubricating oil is quickly supplied between the large end surfaces of the tapered rollers and the large flange of the inner ring, thereby effectively increasing the seizure resistance between the large end surfaces of the tapered rollers and the large flange of the inner ring.

Also, the following structure may be used: Each of the pillars has roller guiding surfaces each configured to guide a conical outer peripheral surface of one of the tapered rollers, and a cutout for releasing oil is formed in an end of the pillar closer to the small-diameter-side annular portion so as to extend across each of the roller guiding surfaces in a radial direction of the cage.

With this arrangement, lubricating oil flowing into the space radially inwardly of the cage while the tapered roller bearing is rotating is quickly released through the cutouts in the ends of the pillars closer to the small-diameter-side annular portion, into the space radially outward of the cage. Therefore, due to the damming action of the large flange of the inner ring, it is possible to reduce the amount of lubricating oil remaining in the bearing, and thus to reduce the torque loss of the bearing due to the stirring resistance of lubricating oil.

Each of the pillars has preferably triangular recesses each formed so as to be integral with one of the cutouts, and extending from the one of the cutouts toward the large-diameter-side annular portion such that a width of the triangular recess in the radial direction of the cage gradually deceases toward the large-diameter-side annular portion.

With this arrangement, while the tapered roller bearing is stopped, lubricating oil remains in the triangular recesses of the pillars extending from the respective oil releasing cutouts toward the large-diameter-side annular portion. Therefore, when the bearing is started thereafter, sufficient amounts of lubricating oil is quickly supplied between the large end surface of the tapered roller and the large flange of the inner ring, thereby effectively increasing the seizure resistance between the large end surfaces of the tapered rollers and the large flange of the inner ring. Also, when forming a the cage by resin molding in a mold, since the portions of the mold for forming the cutouts pass through the triangular recesses, the cutouts can be formed easily.

Also, the following structure is preferably used: The pillars are disposed radially outwardly of a pitch cone passing through centers of the tapered rollers, and the small-diameter-side annular portion includes: a coupling ring portion coupling the pillars together at positions radially outwardly of the pitch cone; and an inwardly extending flange radially inwardly extending from the coupling ring portion.

With this arrangement, the inwardly extending flange on the small diameter side of the cage reduces the amount of lubricating oil flowing into the bearing from the outside thereof. This reduces the stirring resistance of lubricating oil remaining in the bearing, thus reducing the torque loss of the bearing due to the stirring resistance of lubricating oil.

Also, the present invention provides a tapered roller bearing in which the above cage is used, the tapered roller comprising: an outer ring having a conical outer ring raceway surface on an inner periphery of the outer ring; an inner ring having, on an outer periphery of the inner ring, a conical inner ring raceway surface located radially inwardly of, and opposed to, the conical outer ring raceway surface; the plurality of tapered rollers which are mounted between the conical outer ring raceway surface and the conical inner ring raceway surface so as to be circumferentially spaced apart from each other; and the above cage, keeping circumferential distances between the tapered, rollers, wherein the inner ring includes: a small flange located on a small diameter side of the conical inner ring raceway surface; and a large flange configured to come into contact with the large end surfaces of the tapered rollers.

The following structure is preferably added to the tapered roller bearing: The small-diameter-side annular portion of the cage has an inner periphery on which a plurality of protrusions are formed so as to be circumferentially spaced apart from each other, such that a size of a gap between an incircle of the protrusions and an outer diameter of the small flange is 1.0% or less of the outer diameter of the small flange.

With this arrangement, because the gap between the small-diameter-side annular portion of the cage and the small flange of the inner ring is small, the amount of lubricating oil flowing into the bearing from the outside thereof is correspondingly small. This reduces the stirring resistance of lubricating oil remaining in the bearing, thus reducing the torque loss of the bearing due to the stirring resistance of lubricating oil. Also, due to the protrusions on the inner periphery of the small-diameter-side annular portion of the cage, even when the cage radially moves during rotation of the bearing, the inner periphery of the small-diameter-side annular portion of the cage is prevented from coming into surface contact with the outer periphery of the small flange of the inner ring, thus reducing bearing torque.

The protrusions are preferably ribs extending in an axial direction of the cage and each having a circular arc-shaped cross section.

With this arrangement, when the cage radially moves during rotation of the bearing, and the inner periphery of the small-diameter-side annular portion of the cage approaches the outer periphery of the small flange of the inner ring, oil films due to the wedge film effect is formed between the outer periphery of the small flange and some of the protrusions on the inner periphery of the small-diameter-side annular portion. The oil films prevent direct contact between the protrusions on the inner periphery of the small-diameter-side annular portion and the outer periphery of the small flange, thus reducing bearing torque.

The large-diameter-side pocket surfaces of the cage are preferably inclined relative to a direction perpendicular to an axial direction of the cage so as to face, while being oriented parallel to, the large end surfaces of the respective tapered rollers.

This arrangement enables the large-diameter-side pocket surfaces to come into contact with the large end surfaces of the respective tapered rollers with the oil retaining holes exposed to the large end surfaces of the tapered rollers. This provides for effective lubrication of the large end surfaces of the tapered rollers.

Effects of the Invention

By using the cage according to the present invention in a tapered roller bearing, while the tapered roller bearing is rotating, lubricating oil is introduced into the oil retaining holes by capillary action, and when the tapered roller bearing is stopped thereafter, the lubricating oil in the oil retaining holes is prevented from falling out of the oil retaining holes by gravity, i.e., retained therein by capillary action. When the tapered roller bearing is started thereafter, the lubricating oil in the oil retaining holes flows out of the oil retaining holes, and is supplied to the large end surfaces of the tapered rollers, by centrifugal force. This effectively increases the seizure resistance between the large end surfaces of the tapered rollers and the large flange of the inner ring when the tapered roller bearing is started after having been stopped for a long time.

BEST MODE FOR CARRYING OUT THE INVENTION

Figure 1:
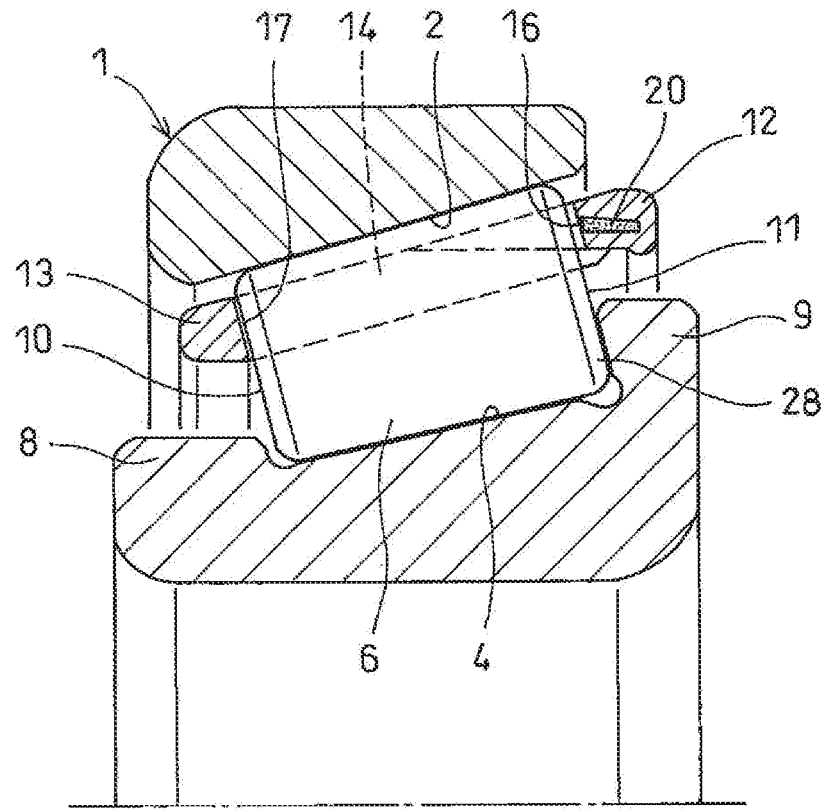
FIG. 1 is a sectional view of a tapered roller hearing in which a cage for a tapered roller bearing according to a first embodiment of the present invention is mounted, as taken along a plane including the axis of the tapered roller bearing.
Figure 1:
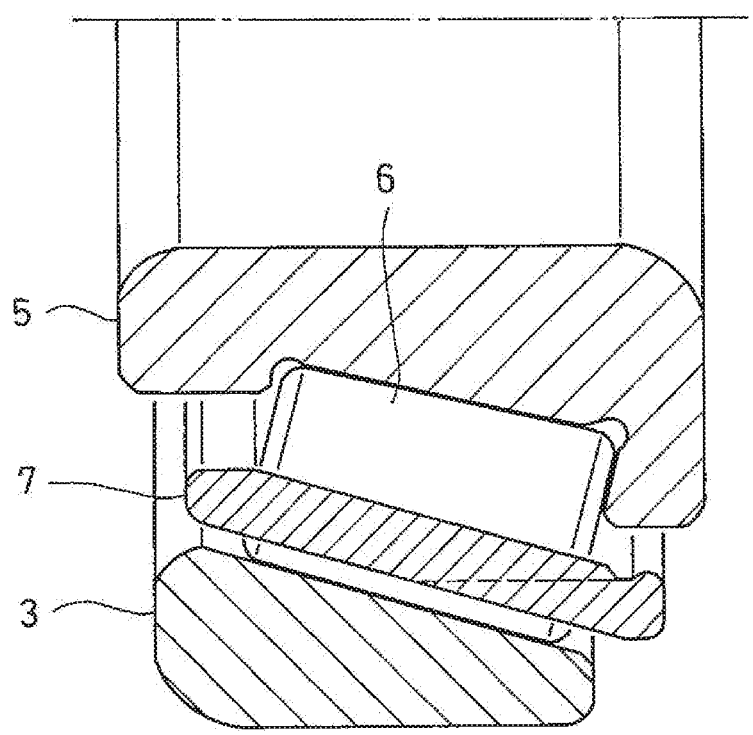

FIG. 1 illustrates a tapered roller bearing 1 according to the first embodiment of the present invention which includes an outer ring 3 having a conical outer ring raceway surface 2 on its inner periphery; an inner ring 5 having a conical inner ring raceway surface 4 on its outer periphery; a plurality of tapered rollers 6 disposed between the outer ring raceway surface 2 and the inner ring raceway surface 4 so as to be circumferentially spaced apart from each other; and a cage 7 keeping the distances between the tapered rollers 6.

On the outer periphery of the inner ring 5, a small flange 8 and a large flange 9 are further formed which are located, respectively, on the small diameter side and the large diameter side of the inner ring raceway surface 4. The inner ring raceway surface 4 is located radially inwardly of, and opposed to, the outer ring raceway surface 2. The tapered rollers 6 are in rolling contact with the outer ring raceway surface 2 and the inner ring raceway surface 4.

The small flange 8 protrudes radially outwardly relative to the inner ring raceway surface 4 so as to be opposed to the small end surfaces 10 of the tapered rollers 6. The small flange 8 restricts movement of the tapered rollers 6 in the direction from the large to small diameter end of the tapered rollers, and thus prevents the tapered rollers 6 from falling off from the inner ring raceway surface 4. The large flange 9 protrudes radially outwardly relative to the inner ring raceway surface 4 so as to be opposed to the large end surfaces 11 of the tapered rollers 6. During rotation of the bearing, the large end surfaces 11 of the tapered rollers 6 and the large flange 9 of the inner ring 5 partially support the axial load by coming into sliding contact with each other. The surface of the large flange 9 that comes into contact with the large end surfaces 11 is a ground surface finished by grinding (specifically, a surface having a surface roughness of 0.2 μm or less).

The cage 7 includes a large-diameter-side annular portion 12 circumferentially extending along the large end surfaces 11 of the tapered rollers 6; a small-diameter-side annular portion 13 circumferentially extending along the small end surfaces 10 of the tapered rollers 6; and a plurality of pillars 14 extending between the respective circumferentially adjacent pairs of tapered rollers 6 and coupling together the large-diameter-side annular portion 12 and the small-diameter-side annular portion 13.

Figure 3:
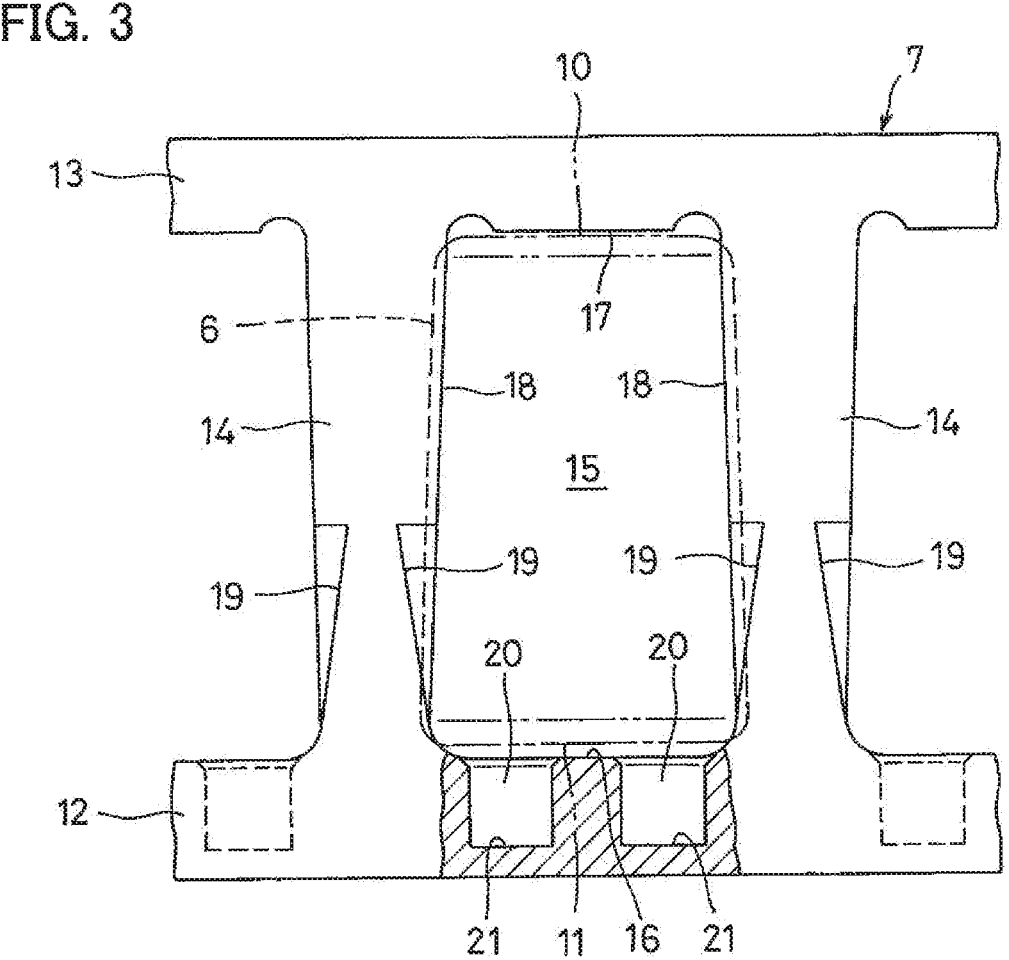
FIG. 3 is a partial sectional view of the cage of FIG. 1 when seen from the radially outer side.

As illustrated in FIG. 3, the large-diameter-side annular portion 12, the small-diameter-side annular portion 13, and the pillars 14 define a plurality of pockets 15 in which the respective tapered rollers 6 are received. More specifically, the large-diameter-side annular portion 12 and the small-diameter-side annular portion 13 define the pairs of axial ends of the pockets 15, and the pillars 14 define the pairs of circumferential ends of the pockets 15. The large-diameter-side annular portion 12 has large-diameter-side pocket surfaces 16 opposed to the large end surfaces 11 of the respective tapered rollers 6. The small-diameter-side annular portion 13 has small-diameter-side pocket surfaces 17 opposed to the small end surfaces 10 of the respective tapered rollers 6.

As illustrated in FIG. 1, the large-diameter-side pocket surfaces 16 are inclined relative to the direction perpendicular to the axial direction of the cage (vertical direction in FIG. 1) so as to face, while being oriented parallel to, the large end surfaces 11 of the respective tapered rollers 6. The small-diameter-side pocket surfaces 17 are also inclined relative to the direction perpendicular to the axial direction of the cage (vertical direction in FIG. 1) so as to face, while being oriented parallel to, the small end surfaces 10 of the respective tapered rollers 6.

Each pillar 14 has roller guiding surfaces 18 each for guiding the conical surface on the outer periphery of the corresponding tapered roller 6; and triangular recesses 19 disposed in the end portion of the pillar 14 closer to the large-diameter-side annular portion 12 so as to be recessed in the circumferential direction of the cage, relative to the respective roller guiding surfaces 18.

Figure 2:
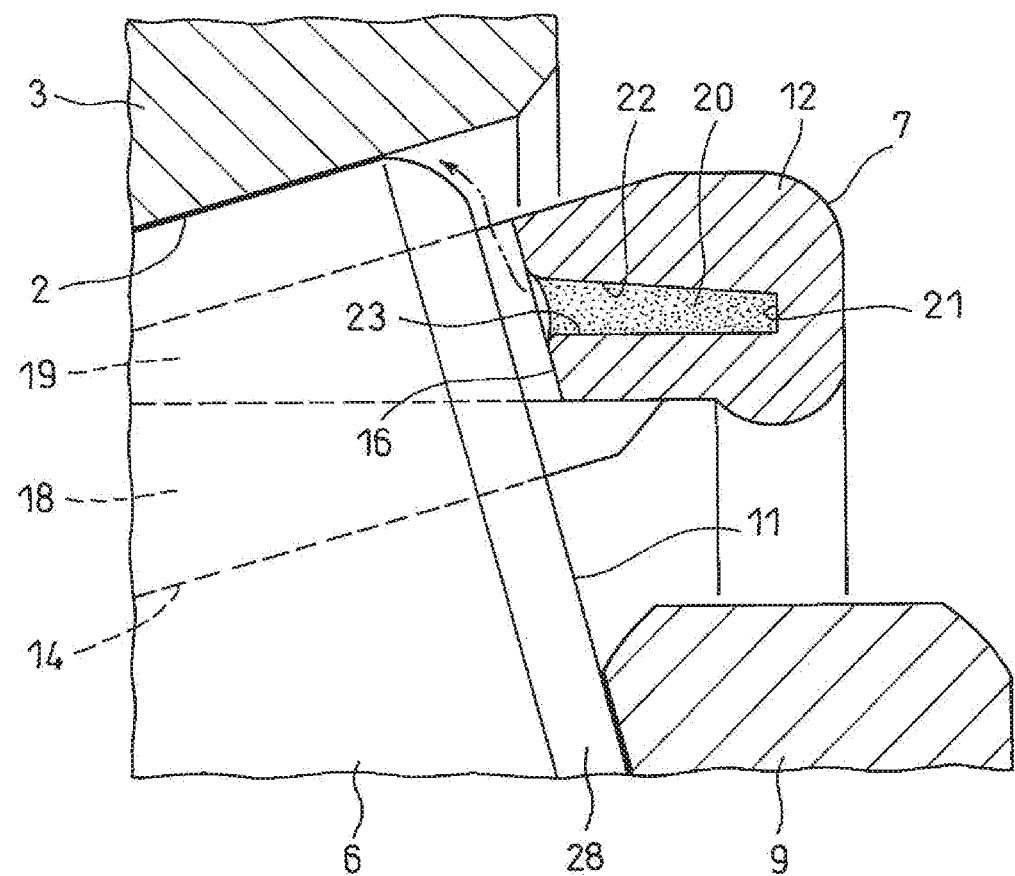
FIG. 2 is an enlarged sectional view illustrating the oil retaining hole of FIG. 1, and its vicinity.

As illustrated in FIG. 2, each triangular recess 19 has the shape of a triangle when seen in the circumferential direction of the cage 7, the triangle having one side thereof defined by the corner between the large-diameter-side annular portion 16 and the pillar 14, with the width of the triangle in the radial direction of the cage gradually decreasing from the above one side of the triangle toward the small-diameter-side annular portion 13. Further, the side of this triangle radially outwardly of the cage coincides with the outer periphery of the cage 7, and the side of this triangle radially inwardly of the cage extends parallel to the axial direction of the cage.

The large-diameter-side pocket surfaces 16 are formed with oil retaining holes 20 configured such that lubricating oil is introduced into and retained in the oil retaining holes by capillary action. The oil retaining holes 20 are non-through or blind holes each having one end thereof open to the large-diameter-side pocket surface 16, and the other end located within the large-diameter-side annular portion 12. That is, the oil retaining holes 20 each extends from the large-diameter-side pocket surface 16 into the large-diameter-side annular portion 12 in the axial direction of the cage and has a bottom 21 within the large-diameter-side annular portion 12. In order to effectively retain lubricating oil by capillary action, the oil retaining holes 20 have openings measuring 2 mm or less (preferably 1.5 mm or less) in the radial direction of the cage 7.

The oil retaining holes 20 are each tapered such that the inner dimension of the oil retaining hole 20 in the radial direction of the cage 7 (vertical direction in FIG. 2) gradually increases toward the large end surface 11 of the tapered roller 6. In the example shown, the oil retaining holes 20 are each shaped such that the portion 22 of the inner surface thereof that faces radially inwardly of the cage is inclined radially outwardly of the cage 7 toward the large end surface 11 of the tapered roller 6. Also, of the inner surface of the oil retaining hole 20, the portion 23 facing radially outwardly of the cage 7 extends parallel to the axial direction of the cage 7 (and thus parallel to the center axis of the tapered roller bearing 1).

The number of the oil retaining holes 20 per large-diameter-side pocket surface 16 may be three or more, but in this embodiment, as illustrated in FIGS. 3 to 7, two such oil retaining holes 20 are formed in each large-diameter-side pocket surface 16, and the two oil retaining holes 20 are spaced apart from the center of the large-diameter-side pocket surface 16 to the opposite sides of the center in the circumferential direction of the cage. The openings of the two retaining holes 20 are elongated in the circumferential direction of the cage 7. For example, the dimension of the opening of each oil retaining hole 20 in the circumferential direction of the cage 7 is twice or more as large as the dimension of the opening of the oil retaining hole in the radial direction of the cage 7.

Figure 4:
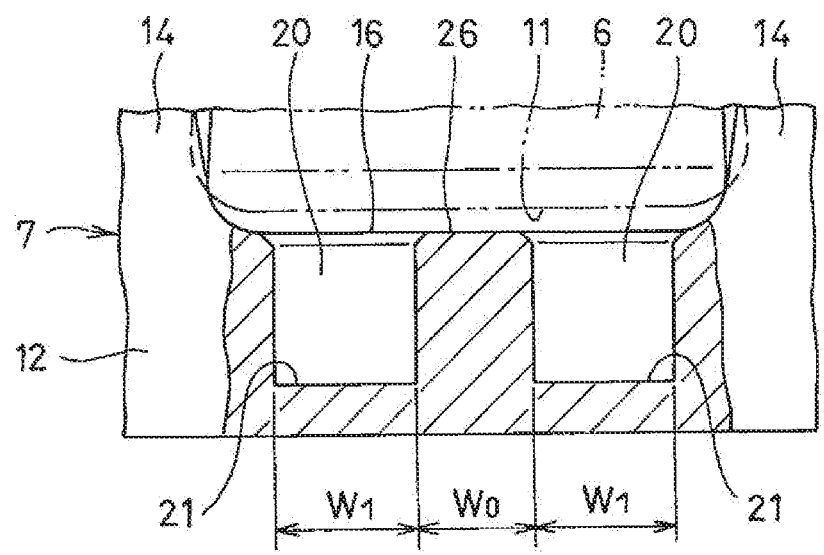
FIG. 4 is an enlarged sectional view illustrating the oil retaining holes of FIG. 3, and their vicinities.

As illustrated in FIG. 4, the widths $W_1$ of the openings of the two oil retaining holes 20 in the circumferential direction of the cage (right-and-left direction in FIG. 4) are equal to or larger than the width $W_0$, in the circumferential direction of the cage, of an unopen section 26 between the two oil retaining holes 20. The unopen section 26 between the two oil retaining holes 20 is a surface extending parallel to the large end surface 11 of the tapered roller 6. When the cage 7 moves in its axial direction, the unopen section 26 between the two oil retaining holes 20 comes into surface contact with the large surface 11 of the tapered roller 6.

Figure 5:
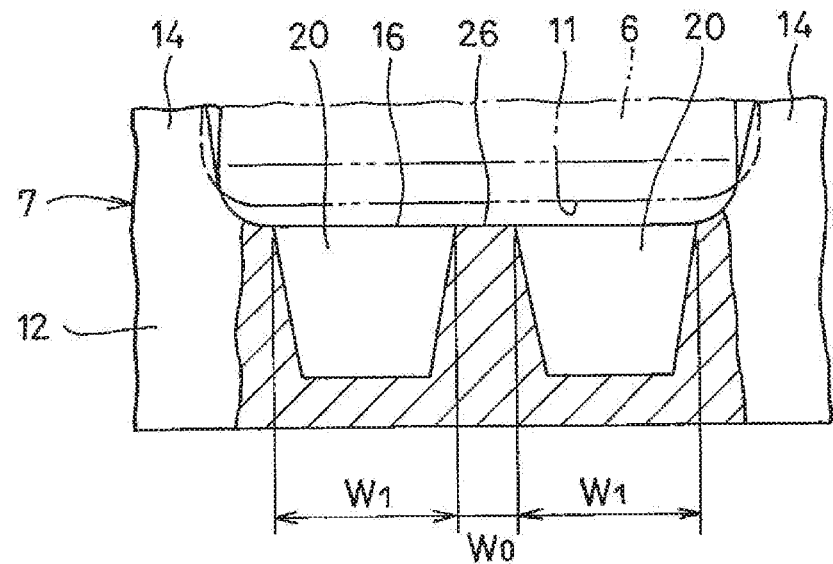
FIG. 5 is a view illustrating a variation of the oil retaining holes of FIG. 4.

In the example of FIG. 4, the two oil retaining holes 20 are each straight-shaped such that the width of the oil retaining hole 20 between its inner surface portions opposed to each other in the circumferential direction of the cage is uniform in the axial direction of the cage 7 (vertical direction in FIG. 4). However, as illustrated in FIG. 5, each oil retaining hole 20 may be tapered such that the width of the oil retaining hole 20 between its inner surface portions opposed to each other in the circumferential direction of the cage gradually increases in the axial direction of the cage toward the large end surface 11 of the tapered roller 6. With this arrangement, it is possible to increase the volume of lubricating oil retained in the oil retaining holes 20, and thus to effectively lubricate the large end surfaces 11 of the tapered rollers 6.

The cage 7 is seamlessly and integrally formed of a synthetic resin. As the synthetic resin forming the cage 7, polyamide may be used. By using polyamide, since polyamide has a relatively high lipophilicity, lubricating oil shows high wettability with the inner surfaces of the oil retaining holes 20 of the cage, and thus can be effectively retained in the oil retaining holes 20 due to the surface tension of the lubricating oil. As the polyamide, it is possible to use a super engineering plastic such as polyamide 66 (PA66), polyamide 46 (PA46) or polynonamethylene terephthalamide (PAST). Instead of polyamide, for example, polyphenylene sulfide (PPS) or polyether ether ketone (PEEK) may be used. A reinforcing fiber material (such as glass fiber, carbon fiber or aramid fiber) is added to the synthetic resin forming the cage 7. If PA66, PA46 or PPS is used as the synthetic resin forming the cage 7, it is possible to ensure heat resistance and chemical resistance of the cage 7.

Figure 6:
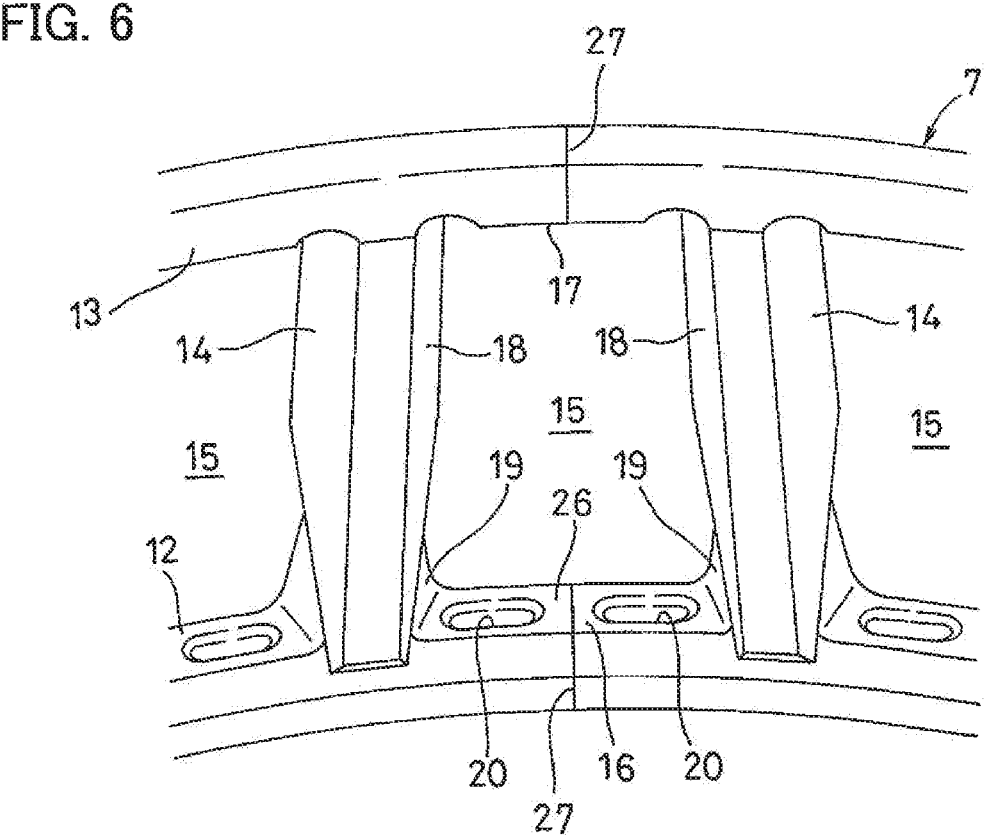
FIG. 6 is a partial perspective view of the cage of FIG. 3.

When integrally forming the large-diameter-side annular portion 12, the small-diameter-side annular portion 13, and the pillars 14 by resin molding during which a weld line or lines 27 form where the flow of resin meet, the resin molding is preferably performed such that, as shown in FIG. 6, the weld line or each of the weld lines 27 is located on one of the unopen sections 26 between of the respective pairs of oil retaining holes 20. In this way, it is possible to effectively minimize the strength decrease of the cage 7 caused by forming the oil retaining holes 20, and thus to keep the cage 7 substantially equal in strength to conventional cages.

Figure 7:
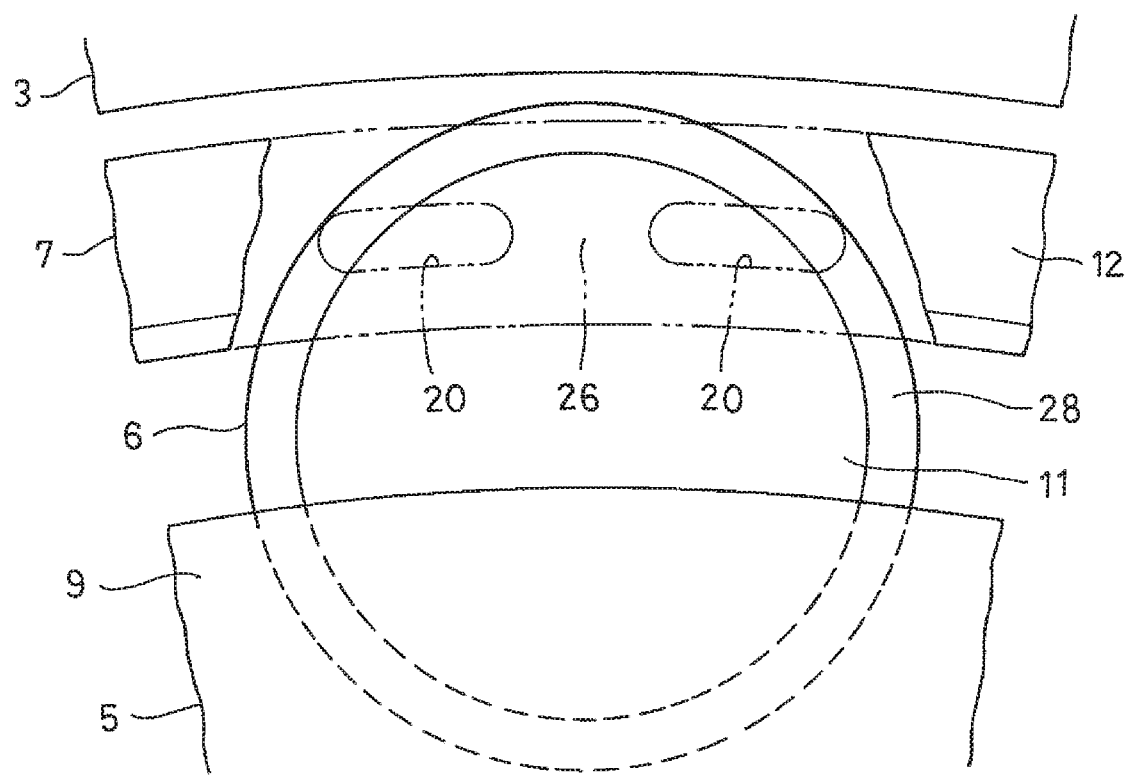
FIG. 7 is a view showing the large end surface of a tapered roller by partially removing the large-diameter-side annular portion of the cage to illustrate the positional relationship between the large end surface of the tapered roller and the oil retaining holes of FIG. 3.

As illustrated in FIG. 7, each oil retaining hole 20 is disposed such that, when seen in the axial direction of the corresponding tapered roller 6, a portion of the opening of the oil retaining hole 20 that accounts for 50% or more of the area of the entire opening is aligned with the large end surface 11 of the tapered roller 6. Here, the large end surface 11 refers to a surface portion of the tapered roller 6 located inwardly of a chamfer 28 disposed on the outer periphery of the tapered roller 6 at its large diameter end (in the example, shown, the chamfer 28 is a rounded chamfer having a circular arc-shaped cross section).

Figure 19:
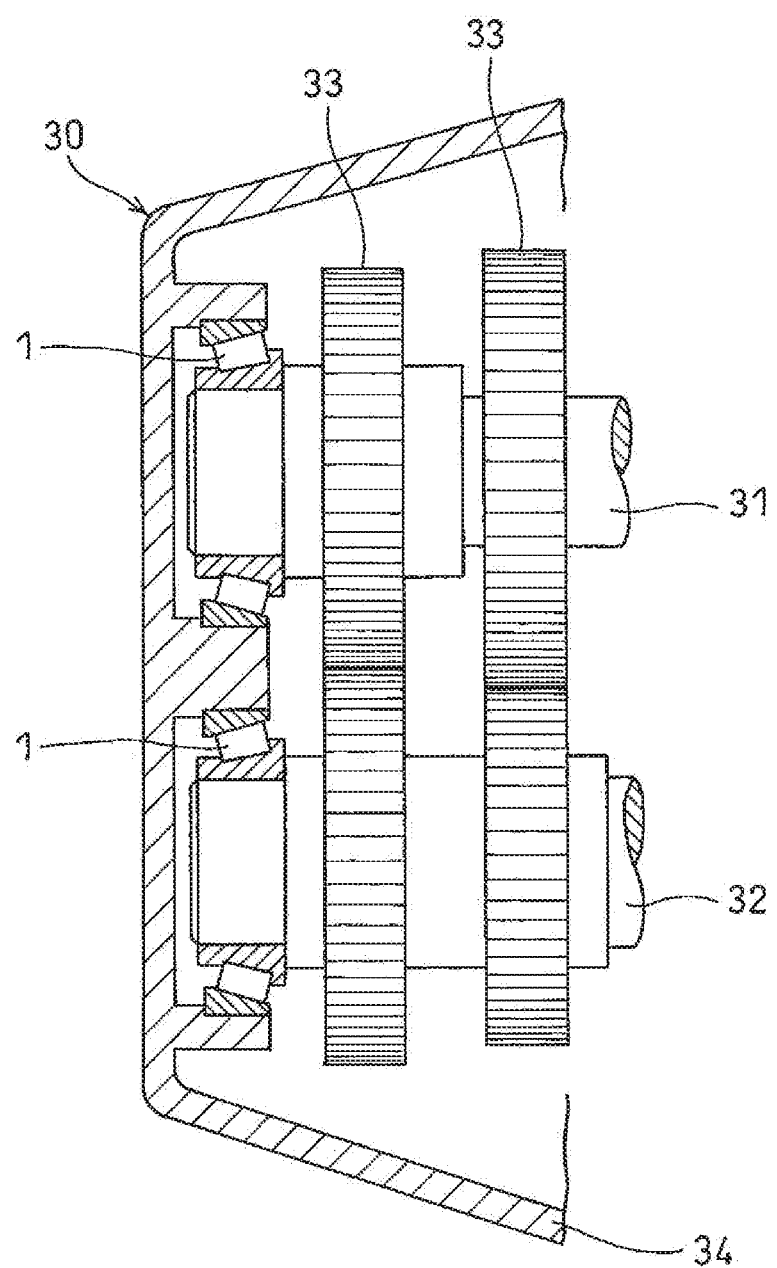
FIG. 19 is a view exemplifying a transmission in which tapered roller bearings as illustrated in FIG. 1 are used.

FIG. 19 illustrates an example in which tapered roller bearings 1 as described above are used as rolling bearings for rotatably supporting rotary shafts (input and output shafts 31 and 32 in this example) of an automotive transmission 30. The transmission 30 includes an input shaft 31 to which the rotation of the engine is inputted; an output shaft 32 extending parallel to the input shaft 31; a plurality of gear trains 33 which transmit the rotation of the input shaft 31 to the output shaft 32; and a plurality of clutches (not shown) disposed between the input shaft 31 and the respective gear trains 33, or between the output shaft 32 and the respective gear trains 33. By selectively engaging any one of the clutches, the rotation of the input shaft 31 is transmitted through the selected gear train 33 to the output shaft 32 in the selected gear ratio. The rotation of the output shaft 32 is outputted to an output gear (not shown), and the rotation of the output gear is transmitted to a differential mechanism (not shown). The differential mechanism includes a ring gear (not shown) in mesh with the output gear of the transmission 30, and the rotation inputted from the output gear to the ring gear is distributed and transmitted to right and left vehicle wheels. The input shaft 31 and the output shaft 32 are rotatably supported by the tapered roller bearings 1, respectively. The tapered roller bearings 1 are lubricated by droplets of lubricating oil stored in a housing 34 and splashed due to the rotation of gears.

While a tapered roller bearing is rotating, lubricating oil is continuously supplied to the tapered roller bearing. However, while the tapered roller bearing is stopped, lubricating oil is not supplied to the tapered roller bearing. Therefore, when a conventional tapered roller bearing is stopped for a long time, most of the lubricating oil adhering to the tapered roller bearing will flow away, so that, when the tapered roller bearing is started thereafter, the tapered roller bearing may not be sufficiently lubricated.

Especially in recent years, in order to reduce energy loss caused by the stirring resistance of lubricating oil, there is a growing tendency to use low-viscosity lubricating oil, or reduce the amount of lubricating oil, in automotive transmissions and differential mechanisms. Therefore, when a conventional tapered roller bearing is stopped for a long time, the amount of lubricating oil remaining in the tapered roller bearing tends to decrease to an insufficient level. As a result, when the tapered roller bearing is started thereafter, the temperature of the bearing between the large end surfaces of the tapered rollers and the large flange of the inner ring may rise sharply.

The tapered roller bearing 1 of this embodiment overcomes this problem as follows. That is, while the tapered roller bearing 1 is rotating, lubricating oil is introduced into the oil retaining holes 20 by capillary action. When the tapered roller bearing 1 is stopped thereafter, as illustrated in FIG. 2, the lubricating oil in the oil retaining holes 20 is retained in the oil retaining holes 20 by capillary action without falling out of the oil retaining holes 20 by gravity. When the tapered roller bearing 1 is started thereafter, as shown in the dashed arrow in FIG. 2, the lubricating oil in the oil retaining holes 20 flows out of the oil retaining holes 20, and is supplied to the large end surfaces 11 of the tapered rollers 6 by centrifugal force. This effectively increases the seizure resistance between the large end surfaces 11 of the tapered rollers 6 and the large flange 9 of the inner ring 5 when the tapered roller bearing 1 is started after having been stopped for a long time.

Also, in this tapered roller bearing 1, because the opening of each oil retaining hole 20 has a maximum dimension of 2 mm or less (preferably 1.5 mm or less) in the radial direction of the cage 7, the surface tension of the lubricating oil in the oil retaining hole 20 is dominant over the gravity applied to the lubricating oil, so that the lubricating oil is effectively retained in the retaining oil 20.

Also, in this tapered roller bearing 1, the portion 22 of the inner surface of each oil retaining hole 20 which faces radially inwardly of the cage 7 is inclined radially outwardly of the cage 7 toward the large end surface 11 of the tapered roller 6. Therefore, when the tapered roller bearing 1 is started, lubricating oil in the oil retaining hole 20 flows, along the inclined inner surface portion of the oil retaining hole 20, toward the large end surface 11 of the tapered roller 6, thus effectively lubricating the large end surface 11 of the tapered roller 6.

Also, as illustrated in FIGS. 3 to 7, this tapered roller bearing 1 is provided with two oil retaining holes 20 per large-diameter-side pocket surface 16 such that the two oil retaining holes 20 are spaced apart from the center of the large-diameter-side pocket surface 16 to the opposite sides of the center in the circumferential direction of the cage. Therefore, while ensuring the strength of the large-diameter-side annular portion 12 of the cage 7, it is possible to efficiently lubricate the radially outer portions of the large end surfaces 11 of the tapered rollers 6 (i.e., the portions of the large end surfaces 11 which partially support the axial load by coming into sliding contact with the large flange 9 of the inner ring 5 during rotation of the bearing).

Also, in this tapered roller bearing 1, since, as illustrated in FIG. 6, the openings, of the two oil retaining holes 20 (in each large-diameter-side pocket surface 16) are elongated in the circumferential direction of the cage, it is possible to widely and uniformly lubricate the radially outer portions of the large end surfaces 11 of the tapered rollers 6 (i.e., the portions of the large end surfaces 11 which partially support the axial load by coming into sliding contact with the large flange 9 of the inner ring 5 during rotation of the bearing).

Another reason why the large end surfaces 11 of the tapered rollers 6 in this tapered roller bearing 1 can be effectively lubricated is because the oil retaining holes 20 are open to the large-diameter-side pocket surfaces 16, and these surfaces come into surface contact with the large end surfaces 11 of the tapered rollers 6.

Also, in this tapered roller bearing 1, because, as illustrated in FIG. 4, the widths $W_1$ of the openings of the oil retaining holes 20 in the circumferential direction of the cage are equal to or larger than the width $W_0$, in the circumferential direction of the cage, of the unopen sections 26 between the respective pairs of oil retaining holes 20, it is possible to increase the volume of lubricating oil retained in the oil retaining holes 20, and thus to effectively lubricate the large end surfaces 11 of the tapered rollers 6, while minimizing the strength decrease of the cage 7 due to the unopen sections 26 between the respective pairs of oil retaining holes 20.

Also, in this tapered roller bearing 1, as illustrated in FIG. 7, the oil retaining holes 20 are each disposed such that, when seen in the axial direction of the corresponding tapered roller 6, a portion of the opening of the oil retaining hole 20 that accounts for 50% or more of the area of the entire opening is aligned with the large end surface 11 of the tapered roller 6. Therefore, when the tapered roller bearing 1 is started after having been stopped for a long time, it is possible to efficiently supply lubricating oil retained in the oil retaining holes 20 to the large end surfaces 11 of the tapered rollers 6 with a minimum loss of lubricating oil.

Figure 8:
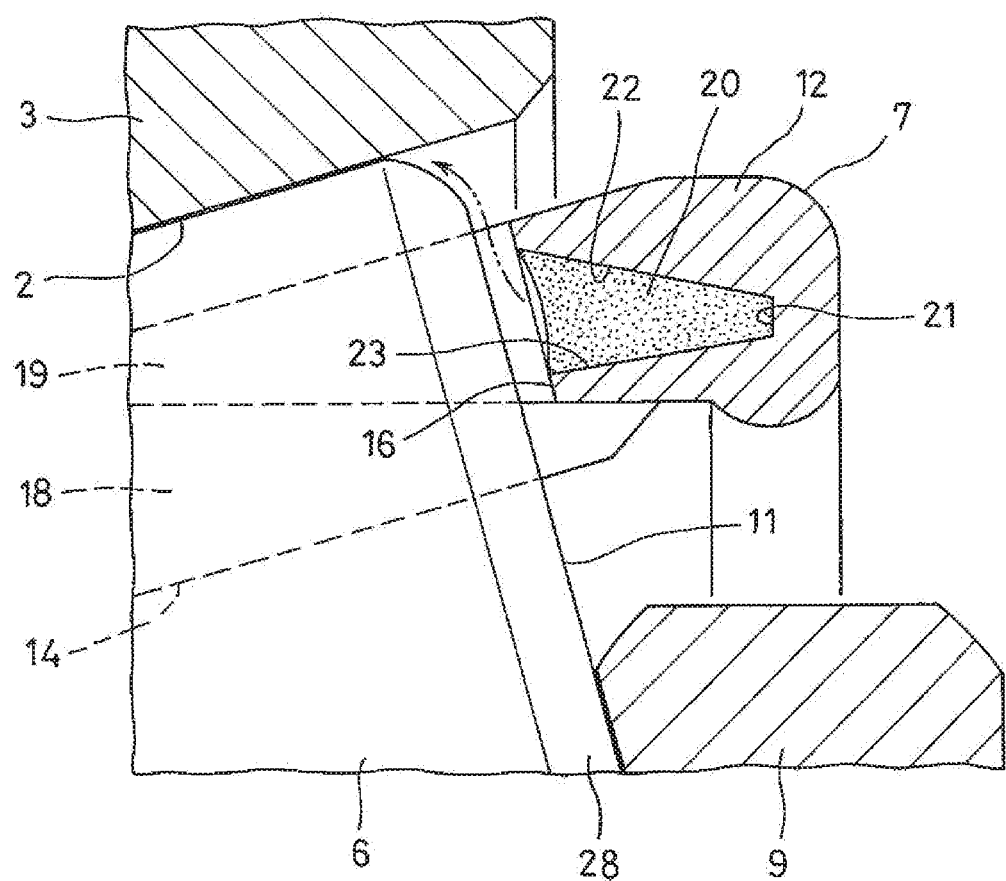
FIG. 8 is a view illustrating a variation of the oil retaining hole of FIG. 2.

While, in the embodiment, the radially outwardly facing portion 23 of the inner surface of each oil retaining hole 20, i.e., its portion facing radially outwardly of the cage 7 extends parallel to the axial direction of the cage 7, the oil retaining holes 20 may be formed such that, as illustrated in FIG. 8, the radially outwardly facing portion 23 is inclined radially inwardly of the cage 7 toward the large end surface 11 of the tapered roller 6. With this arrangement, it is possible to increase the volume of lubricating oil retained in the oil retaining holes 20, and thus to effectively lubricate the large end surfaces 11 of the tapered rollers 6.

The inclination angle of the thus-inclined radially outwardly facing portion 23 relative to the axial direction of the cage is preferably 10 degrees or more (more preferably 12 degrees or more, still more preferably 15 degrees or more), because this inclination angle, range increases the volume of lubricating oil retained in the oil retaining hole 20 while the bearing is stopped, and also enables the lubricating oil retained in the oil retaining hole 20 to flow easily by centrifugal force when the bearing is started.

Figure 9:
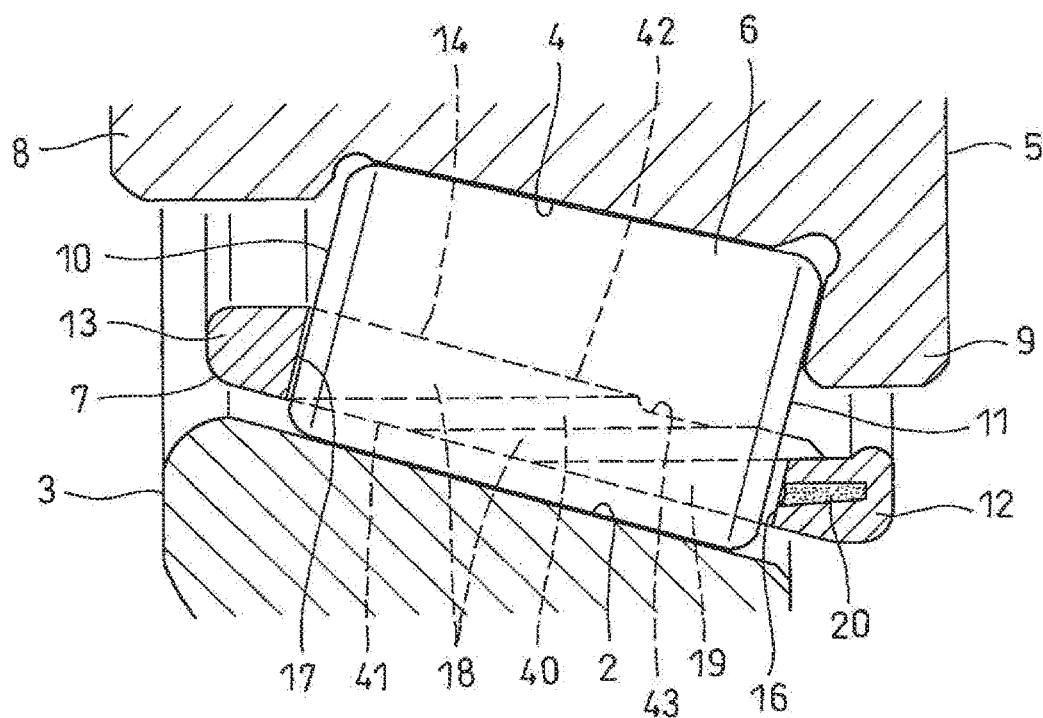
FIG. 9 is an enlarged sectional view of a tapered roller bearing in which a cage for a tapered roller bearing according to a second embodiment of the present invention is mounted, showing a tapered roller of the tapered roller bearing and its vicinity.
Figure 10:
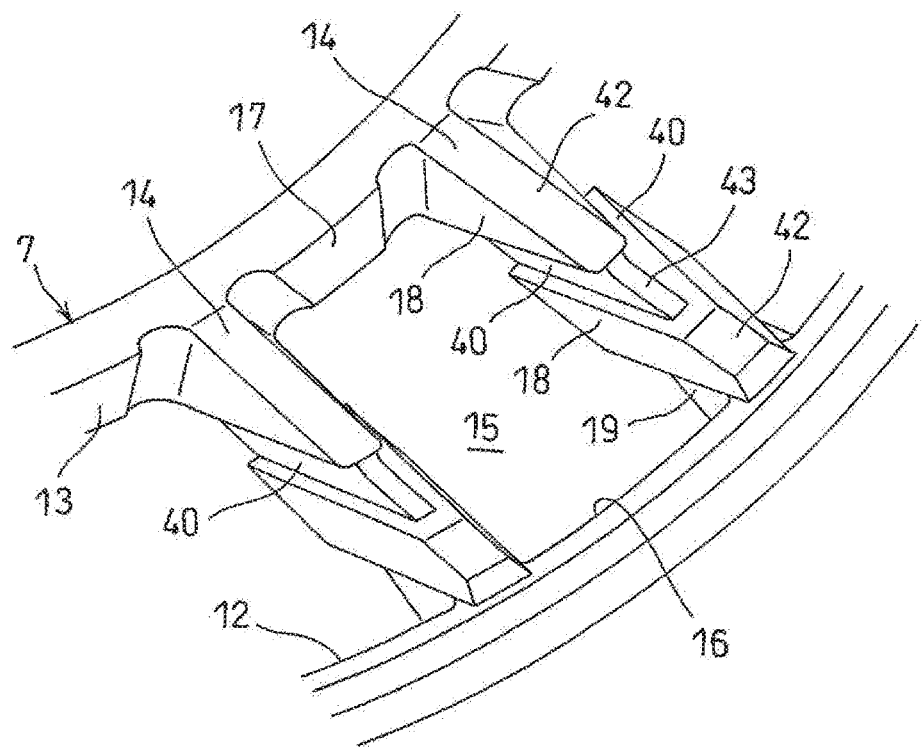
FIG. 10 is a partial perspective view of the cage of FIG. 9.

FIGS. 9 and 10 illustrate a tapered roller bearing according to the second embodiment of the present invention. Its elements corresponding to those of the bearing of the first embodiment are denoted by the same reference numerals, and their description is omitted.

As illustrated in FIG. 9, each pillar 14 of the cage 7 has oil grooves 40 each extending through a respective roller guiding surface 18 in the axial direction of the cage such that one of two ends thereof in the axial direction of the cage that is closer to the small-diameter-side annular portion 13 opens to the outer (in the radial, direction of the cage) surface 41 of the pillar 14, and the other of the two ends, which is closer to the large-diameter-side annular portion 12, opens to the inner (in the radial direction of the cage) surface 42 of the pillar 14. As illustrated in FIG. 10, each pillar 14 has, in its inner (in the radial direction of the cage) surface 42, a communication groove 43 via which the ends of the oil grooves 40 on the respective two sides (in the circumferential direction of the cage) of the pillar 14 communicate with each other.

During rotation of the tapered roller bearing of the second embodiment, lubricating oil flowing from the small-diameter toward large-diameter ends of the tapered rollers 6 while passing through a space radially outward of the cage 7 (i.e., the gap between the cage 7 and the outer ring raceway surface 2) partially flows through the oil grooves 40 in the roller guiding surfaces 18 of the pillars 14 into the space radially inward of the cage, and is thus used to lubricate the large flange 9 of the inner ring 5. Also, since lubricating oil remains in the oil grooves 40 while the bearing is stopped, when the bearing is started thereafter, sufficient amounts of lubricating oil is quickly supplied between the large end surfaces 11 of the tapered rollers 6 and the large flange 9 of the inner ring 5, thereby effectively increasing the seizure resistance between the large end surfaces 11 of the tapered rollers 6 and the large flange 9 of the inner ring 5.

Figure 11:
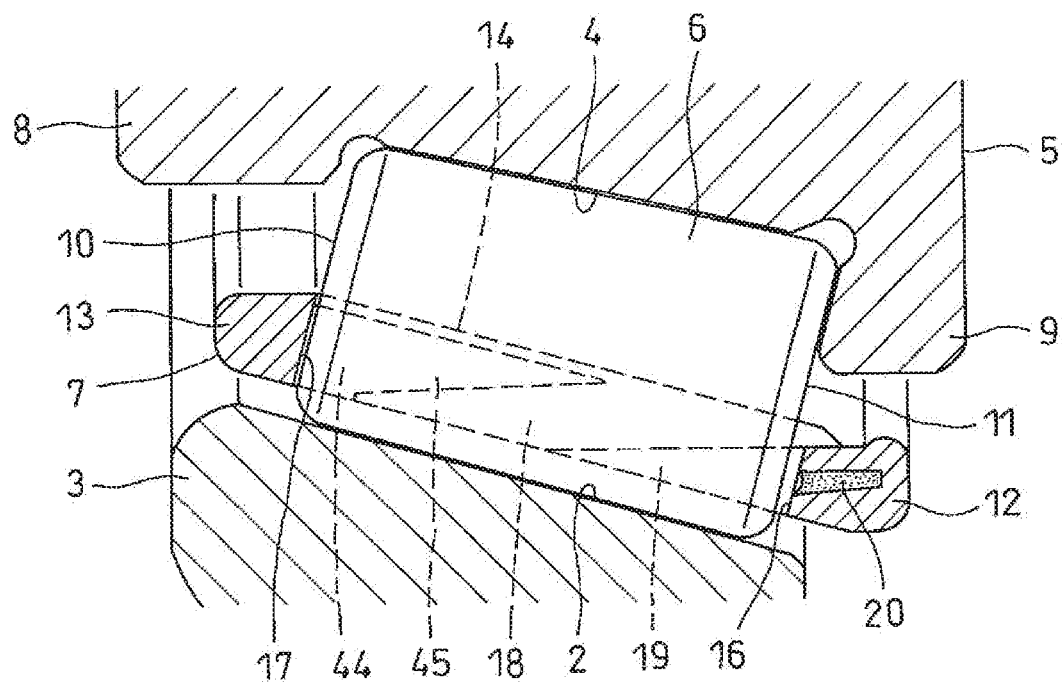
FIG. 11 is an enlarged sectional view of a tapered roller bearing in which a cage for a tapered roller bearing according to a third embodiment of the present invention is mounted, showing a tapered roller of the tapered roller bearing and its vicinity.
Figure 12:
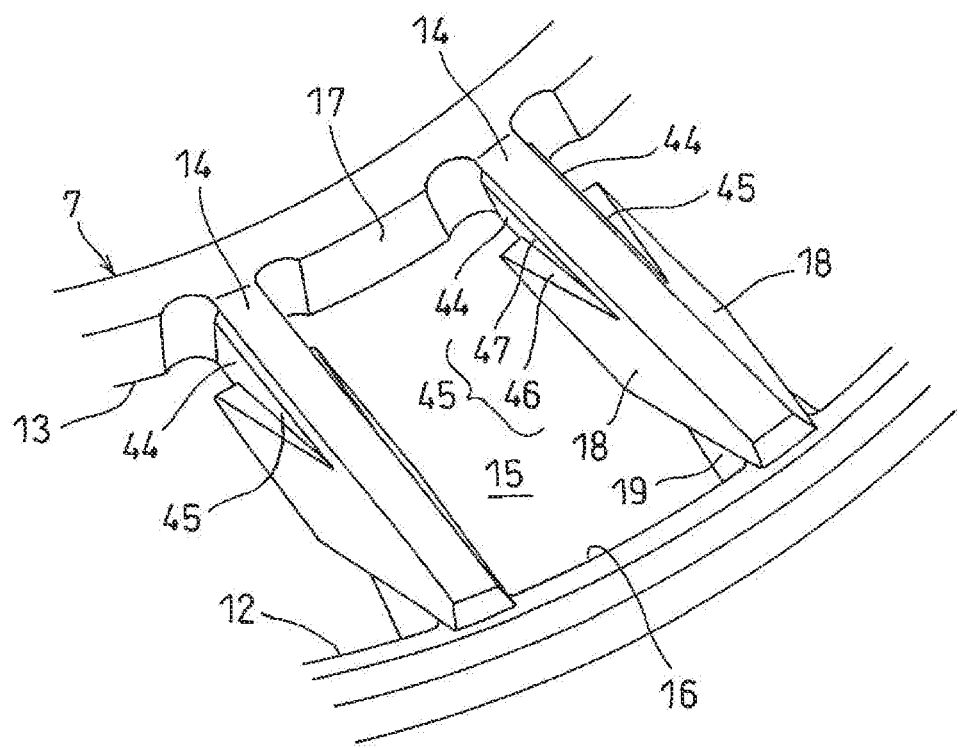
FIG. 12 is a partial perspective view of the cage of FIG. 11.

FIGS. 11 and 12 illustrate a tapered roller bearing according to the third embodiment of the present invention. Its elements corresponding to those of the bearing of the first embodiment are denoted by the same reference numerals, and their description is omitted.

As illustrated in FIG. 11, each pillar 14 has, in its end closer to the small-diameter-side annular portion 13, oil releasing cutouts 44 formed so as to extend across the respective roller guiding surfaces 18 in the radial direction of the cage. The pillar 14 is further formed with triangular recesses 45 each integral with a respective cutout 44, and extending from the cutout 44 toward the large-diameter-side annular portion 12 such that the width of the recess 45 in the radial direction of the cage gradually deceases toward the large-diameter-side annular portion 12. The recesses 45 are recessed from the respective roller guiding surfaces 18 in the circumferential direction of the cage.

As illustrated in FIG. 12, the inner surface of each recess 45 is constituted by two flat surface portions 46 and 47 extending parallel to the axial direction of the cage. The flat surface portion 46 faces inwardly in the radial direction of the cage 7. The flat surface portion 47 faces in the circumferential direction of the cage 7, and is smoothly connected to the inner surface of the cutout 44.

In the tapered roller bearing of the third embodiment, lubricating oil flowing, while the bearing is rotating, into the space radially inward of the cage 7 from the outside of the bearing is quickly released through the cutouts 44 in the ends of the pillars 14 closer to the small-diameter-side annular portion 13, into the space radially outward of the cage 7. Therefore, due to the damming action of the large flange 9 of the inner ring 5, it is possible to reduce the amount of lubricating oil remaining in the bearing, and thus to reduce the torque loss of the bearing due to the stirring resistance of lubricating oil.

Also, while the tapered roller bearing of the third embodiment is stopped, lubricating oil remains in the triangular recesses 45 which extend from the respective oil releasing cutouts 44 toward the large-diameter-side annular portion 12. Therefore, when the bearing is started thereafter, sufficient amounts of lubricating oil is quickly supplied between the large end surfaces 11 of the tapered rollers 6 and the large flange 9 of the inner ring 5, thereby effectively increasing the seizure resistance between the large end surfaces 11 of the tapered rollers 6 and the large flange 9 of the inner ring 5. Also, when forming the cage 7 by resin molding in a mold, since the portions of the mold for forming the cutouts 44 pass through the triangular recesses 45, the oil releasing cutouts 44 can be formed easily.

Figure 13:
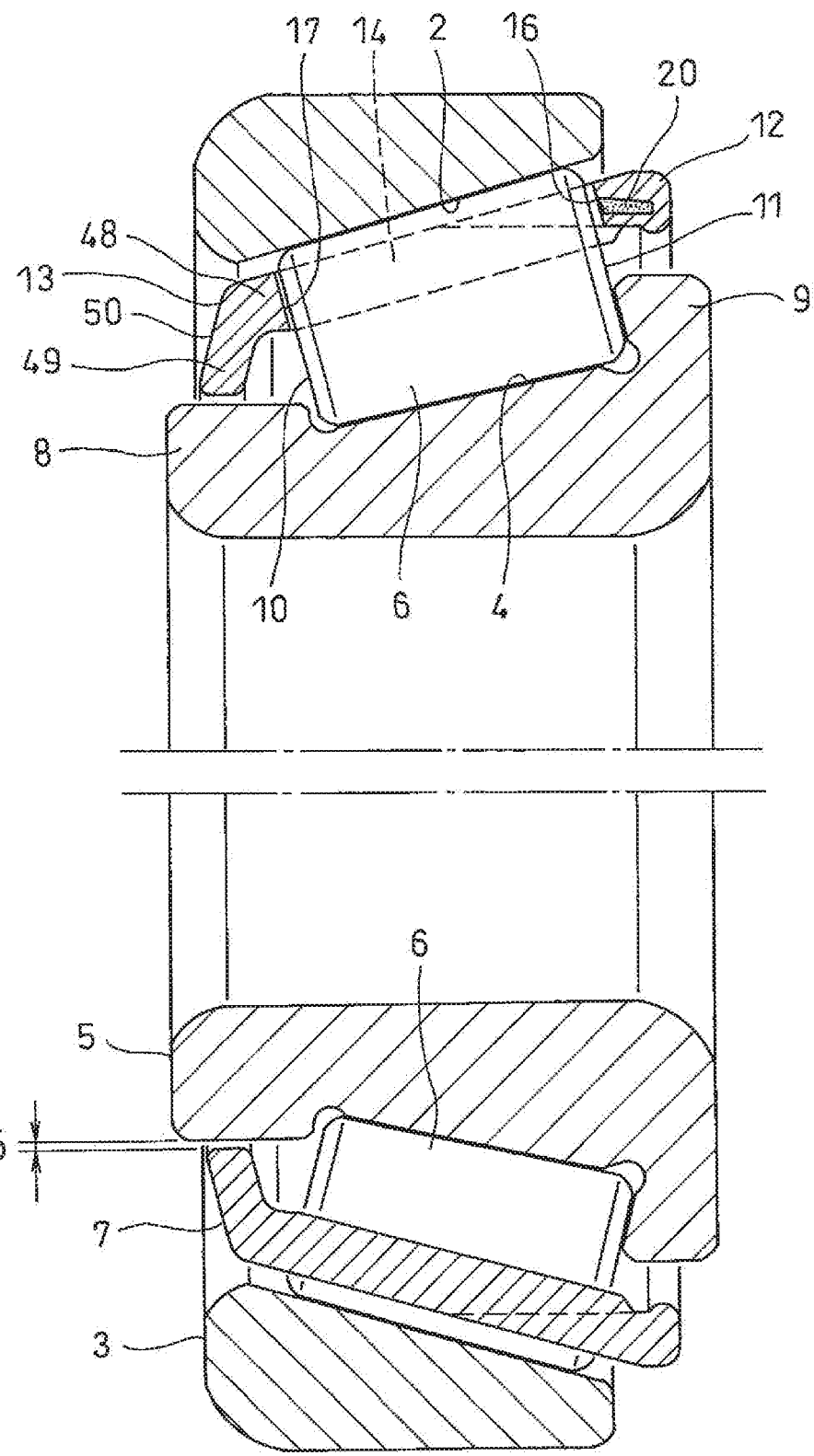
FIG. 13 is a sectional view of a tapered roller bearing in which a cage for a tapered roller bearing according to a fourth embodiment of the present invention is mounted, as taken along a plane including the axis of the tapered roller bearing.

FIG. 13 illustrates a tapered roller bearing according to the fourth embodiment of the present invention. Its elements corresponding to those of the bearing of the first embodiment are denoted by the same reference numerals, and their description is omitted.

The pillars 14 of the cage 7 are disposed radially outwardly of the pitch cone passing through the centers of the tapered rollers 6. The small-diameter-side annular portion 13 of the cage 7 includes a coupling ring portion 48 coupling the pillars 14 together at positions radially outward of the pitch cone; and an inwardly extending flange 49 extending in a generally radially inward direction from the coupling ring portion 48 while being inclined in the direction away from the inner ring raceway surface 4 relative to the direction perpendicular to the axial direction of the cage (vertical direction in FIG. 13). The side surface 50 of the inwardly extending flange 49, i.e., the side surface facing away from the tapered rollers 6, is a tapered surface extending in a generally radially inward direction while being inclined in the direction away from the inner ring raceway surface 4 relative to the direction perpendicular to the axial direction of the cage (vertical direction in FIG. 13). The size δ of the gap between the inner diameter of the inwardly extending flange 49 and the outer diameter of the small flange 8 is 1.0% or less of the outer diameter of the small flange 8.

In the tapered roller bearing of the fourth embodiment, the inwardly extending flange 49 on the small diameter side of the cage 7 reduces the amount of lubricating oil flowing into the bearing from the outside thereof. This reduces the stirring resistance of lubricating remaining in the bearing, thus reducing the torque loss of the bearing due to the stirring resistance of lubricating oil.

Figure 14:
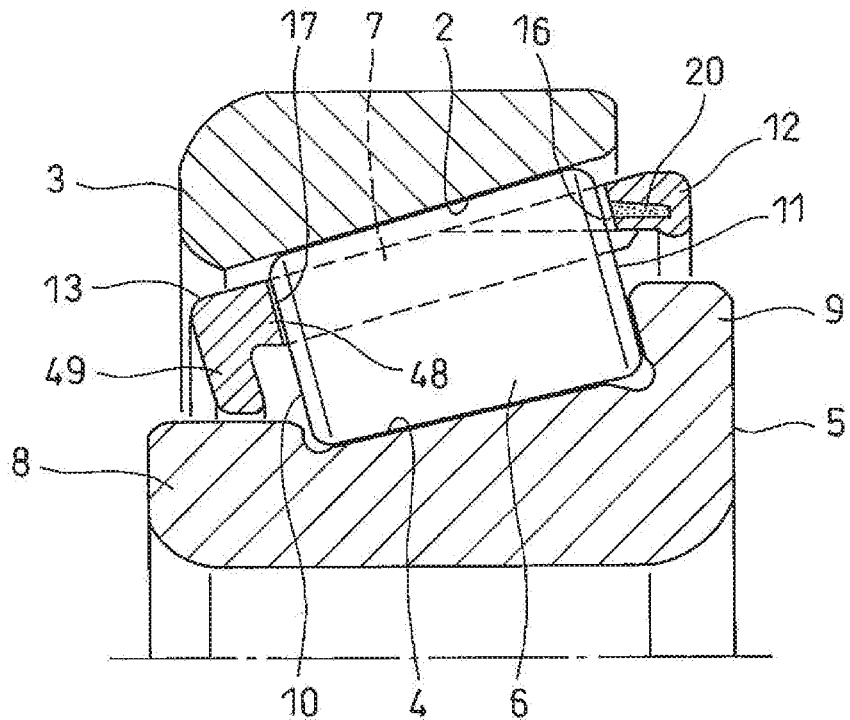
FIG. 14 is a view illustrating a variation of the cage of FIG. 13.

As illustrated in FIG. 14, the inwardly extending flange 49 may be arranged to extend in a generally radially inward direction while being inclined in the direction toward the inner ring raceway surface 4 relative to the direction perpendicular to the axial direction of the cage (vertical direction in FIG. 14).

Figure 15:
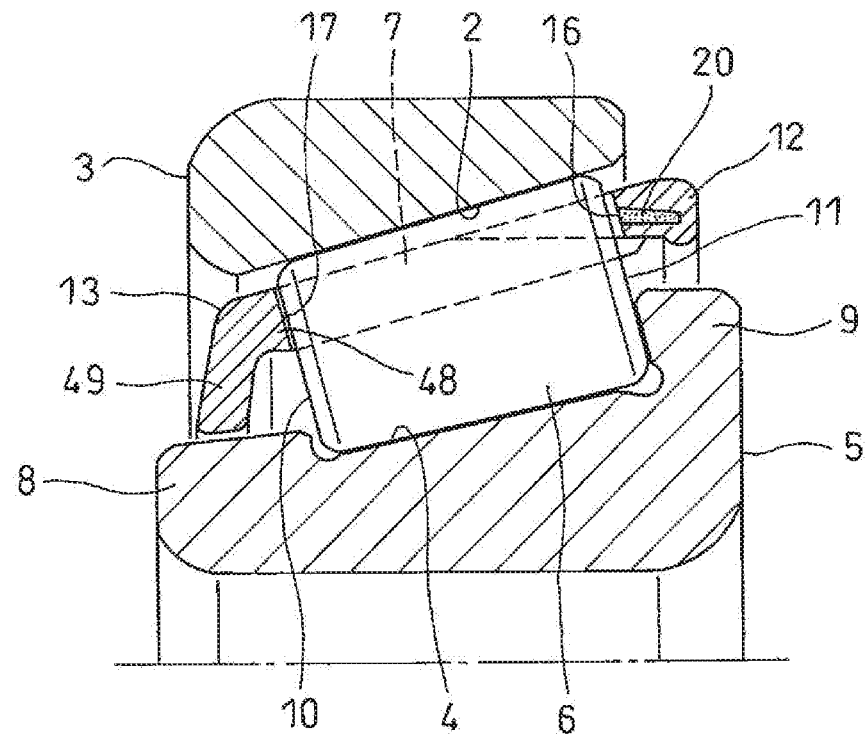
FIG. 15 is a view illustrating a variation of each of the small flange and the cage illustrated in FIG. 13.

As illustrated in FIG. 15, the outer peripheral surface of the small flange 8 of the inner ring 5 may be tapered such that the diameter of the small flange 8 gradually increases toward the inner ring raceway surface 4.

Figure 16:
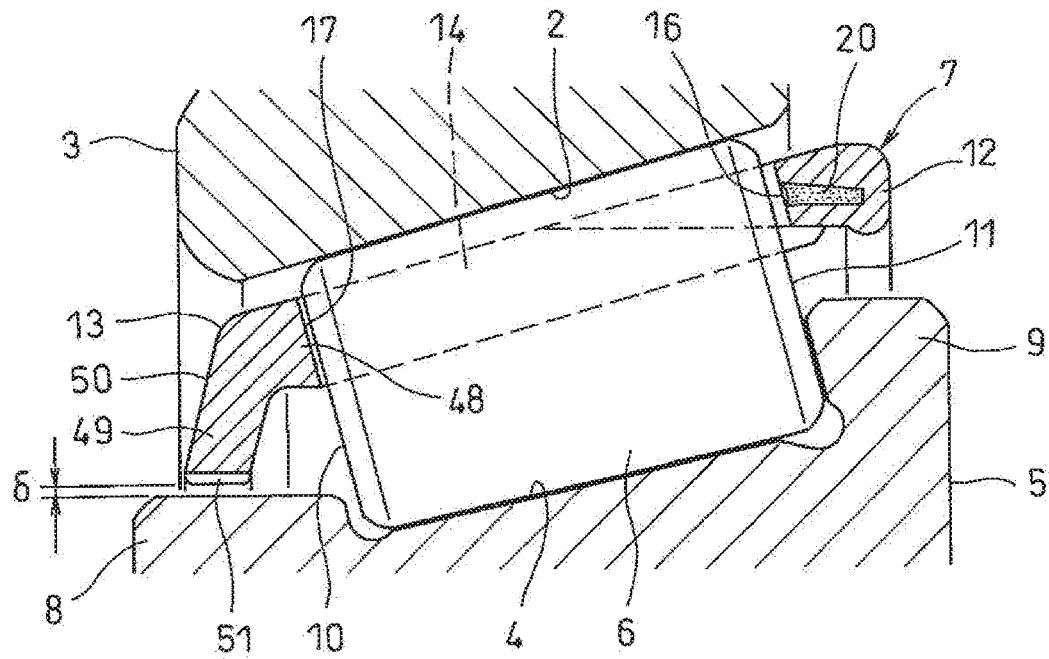
FIG. 16 is an enlarged sectional view of a tapered roller bearing in which a cage for a tapered roller bearing according to a fifth embodiment of the present invention is mounted, showing a tapered roller of the tapered roller bearing and its vicinity.
Figure 17:
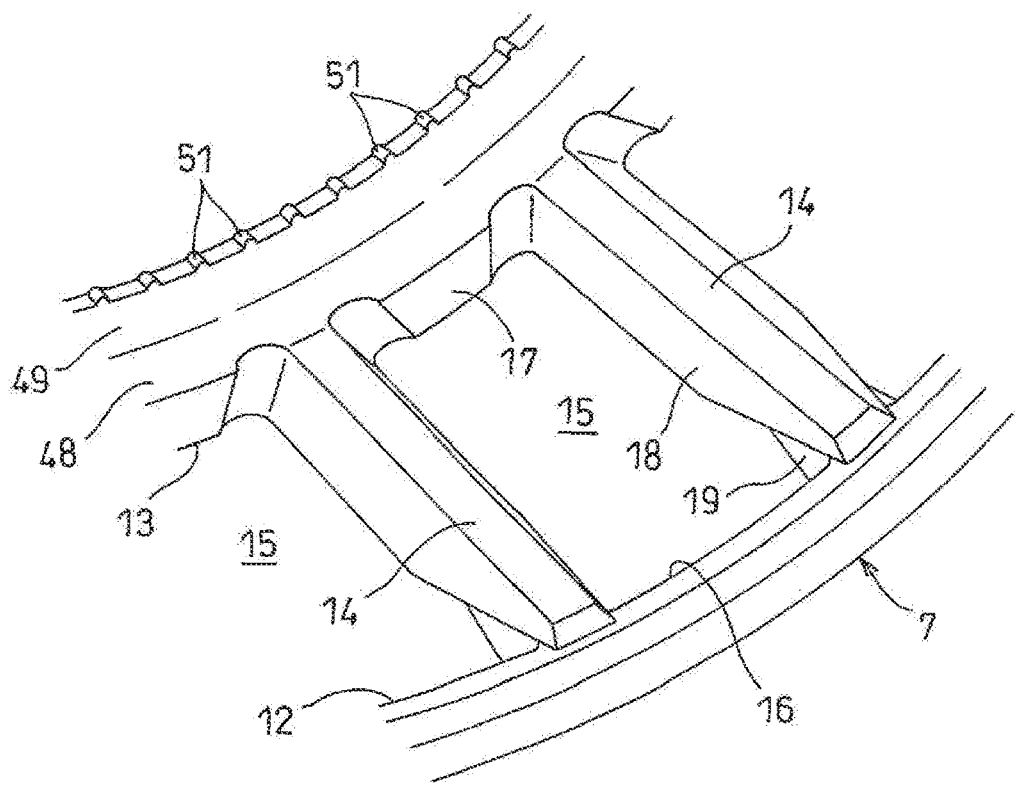
FIG. 17 is a partial perspective view of the cage of FIG. 16

FIGS. 16 and 17 illustrate a tapered roller bearing according to the fifth embodiment of the present invention. Its elements corresponding to those of the bearing of the fourth embodiment are denoted by the same reference numerals, and their description is omitted.

The small-diameter-side annular portion 13 of the cage 7 includes, on its inner periphery, a plurality of protrusions 51 formed so as to be circumferentially spaced apart from each other. The size δ of the gap between the incircle of the protrusions 51 and the outer diameter of the small flange 8 is 1.0% or less of the outer diameter of the small flange 8.

The protrusions 51 are ribs extending in the axial direction of the cage and each having a circular arc-shaped cross section. It should be understood that the term "circular arc-shaped cross section" herein used does not necessarily require that the protrusions 51 should have a strictly completely circular arc-shaped cross section in the mathematical sense, but means that the protrusions 51 may have, e.g., a circular arc-shaped or sine wave-shaped convex curved surface.

In the tapered roller bearing of the fifth embodiment, because the gap between the small-diameter-side annular portion 13 of the cage 7 and the small flange 8 of the inner ring 5 is small, the amount of lubricating oil flowing into the bearing from the outside thereof is correspondingly small. This reduces the stirring resistance of lubricating oil remaining in the bearing, thus reducing the torque loss of the bearing due to the stirring resistance of lubricating oil. Also, due to the protrusions 51 on the inner periphery of the small-diameter-side annular portion 13 of the cage 7, even when the cage 7 radially moves during rotation of the bearing, the inner periphery of the small-diameter-side annular portion 13 of the cage 7 is prevented from coming into surface contact with the outer periphery of the small flange 8 of the inner ring 5, thus reducing bearing torque.

Figure 18:
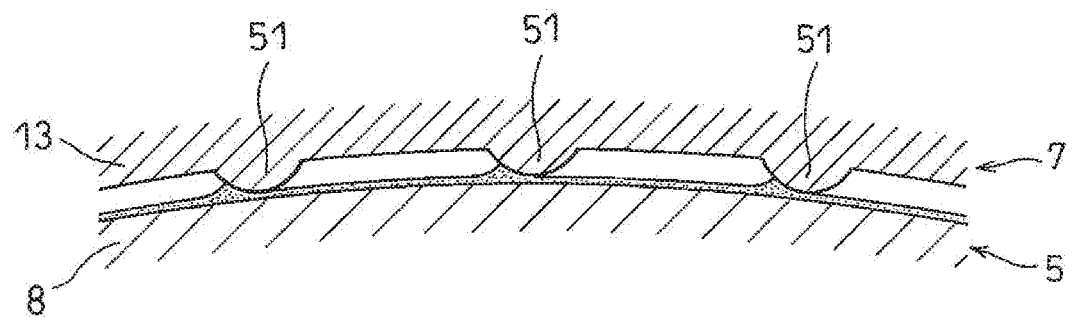
FIG. 18 is an enlarged sectional view illustrating a state in which oil films are formed between some of the protrusions of the cage of FIG. 16 and the small flange of the inner ring as a result of the some of the protrusions and the small flange moving close to each other.

Also, in the tapered roller bearing of the fifth embodiment, because axially extending ribs each having a circular arc-shaped cross section are used as the protrusions 51, when the cage 7 radially moves during rotation of the bearing, and the inner periphery of the small-diameter-side annular portion 13 of the cage 7 approaches the outer periphery of the small flange 8 of the inner ring 5, oil films due to the wedge film effect are formed between the outer periphery of the small flange 8 and some of the protrusions 51 on the inner periphery of the small-diameter-side annular portion 13 as illustrated in FIG. 18. This prevents direct contact between the protrusions 51 and the outer periphery of the small flange 8, thus reducing bearing torque.

While, in the example of FIG. 19, the tapered roller bearings 1 are lubricated by droplets of lubricating oil splashed due to the rotation of gears, the tapered roller bearings 1 may be lubricated by lubricating oil which is pressure-fed from an oil pump driven by the engine, and injected into the housing 34 through nozzles (not shown) (pressure-feed lubrication method). Alternatively, the tapered roller bearings 1 may be lubricated by partially immersing them in lubricating oil stored in the housing 34 (oil bath lubrication method).

Figure 20:
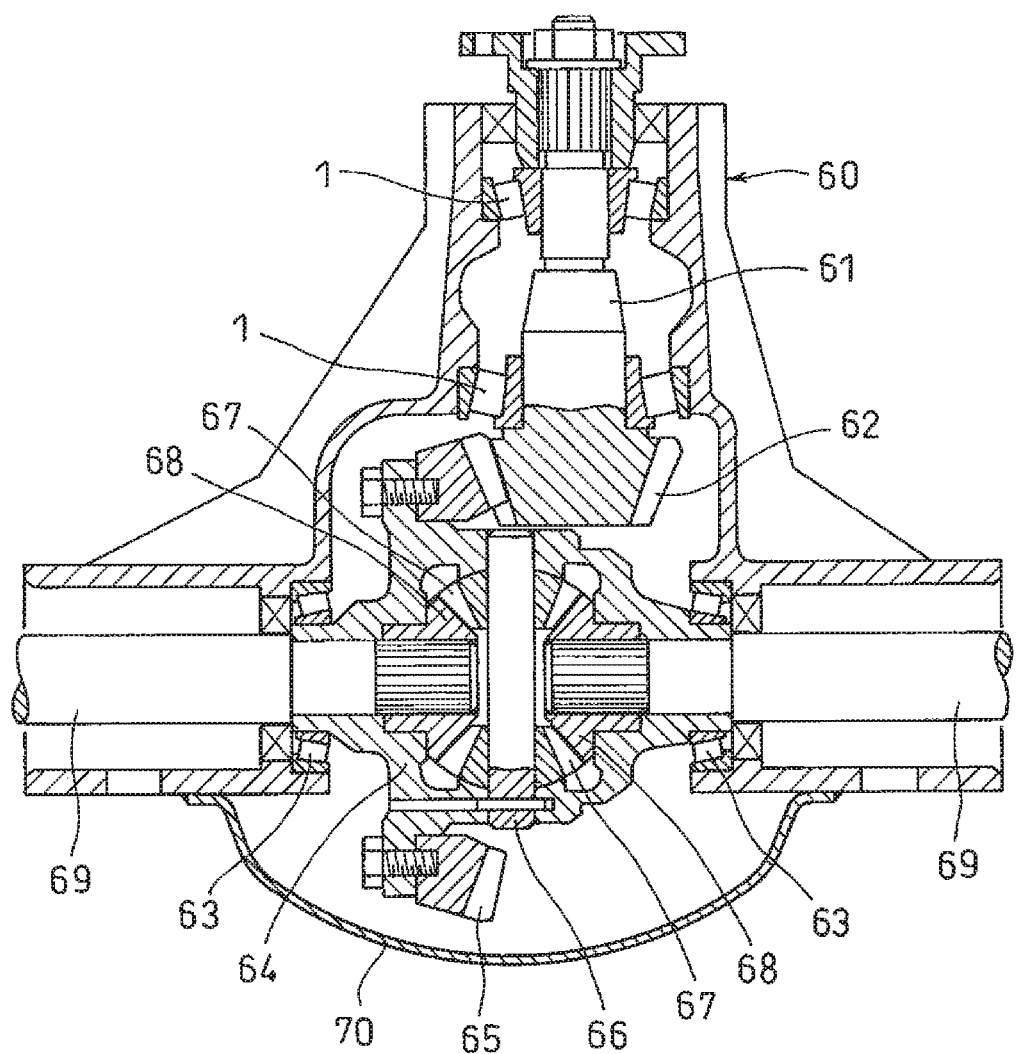
FIG. 20 is a view exemplifying a differential mechanism in which tapered roller bearings as illustrated in FIG. 1 are used.

Tapered roller bearings 1 according to the present invention may be used as rolling bearings for rotatably supporting an input shaft 61 of a differential mechanism 60 shown in FIG. 20. The differential mechanism 60 includes, in addition to the input shaft 61, which is connected to a propeller shaft (not shown) for transmitting the rotation of the engine, a drive pinion 62 fixed to the input shaft 61; a differential case 64 rotatably supported by a pair of bearings 63 axially spaced apart from each other; a ring gear 65 fixed to the differential case 64 so as to be coaxial with the rotation axis of the differential case 64, and meshing with the drive pinion 62; a pinion shaft 66 fixed to the differential case 64 so as to extend in the direction perpendicular to the rotation axis of the differential case 64; a pair of pinions 67 rotatably supported by the pinion shaft 66; and a pair of right and left side gears 68 in mesh with the respective pinions 67. An axle 69 connected to a left vehicle wheel is connected to the left side gear 68. An axle 69 connected to a right vehicle wheel is connected to the right side gear 68. The differential mechanism 60 is configured to distribute and transmit the rotation transmitted to the input shaft 61 from the propeller shaft, to the right and left axles 69. The input shaft 61 of the differential mechanism 60 extends in the direction orthogonal to the rotation axis of the ring gear 65, and the input shaft 61 is rotatably supported by the tapered roller bearings 1. The tapered roller bearings 1 are lubricated by droplets of lubricating oil stored in a housing 70 and splashed due to the rotation of the ring gear 65.

FIGS. 21 to 27 illustrate a tapered roller bearing according to a Reference Example. Its elements corresponding to those of the bearings of the above embodiments are denoted by the same reference numerals, and their description is omitted.

The large-diameter-side annular portion 12 of this example includes, in its inner periphery, a plurality of oil retaining recesses 24 formed so as to be spaced apart from each other in the circumferential direction of the cage. Each oil retaining recess 24 spans the inner periphery of the large-diameter-side annular portion 12 and a respective large-diameter-side pocket surface 16. In other words, each oil retaining recesses 24 opens at both the inner periphery of the large-diameter-side annular portion 12 and a respective large-diameter-side pocket surface 16. As illustrated, in FIG. 22, the oil retaining recess 24 is open in a rectangular shape when seen from the radially inner side of the cage.

Figure 21:
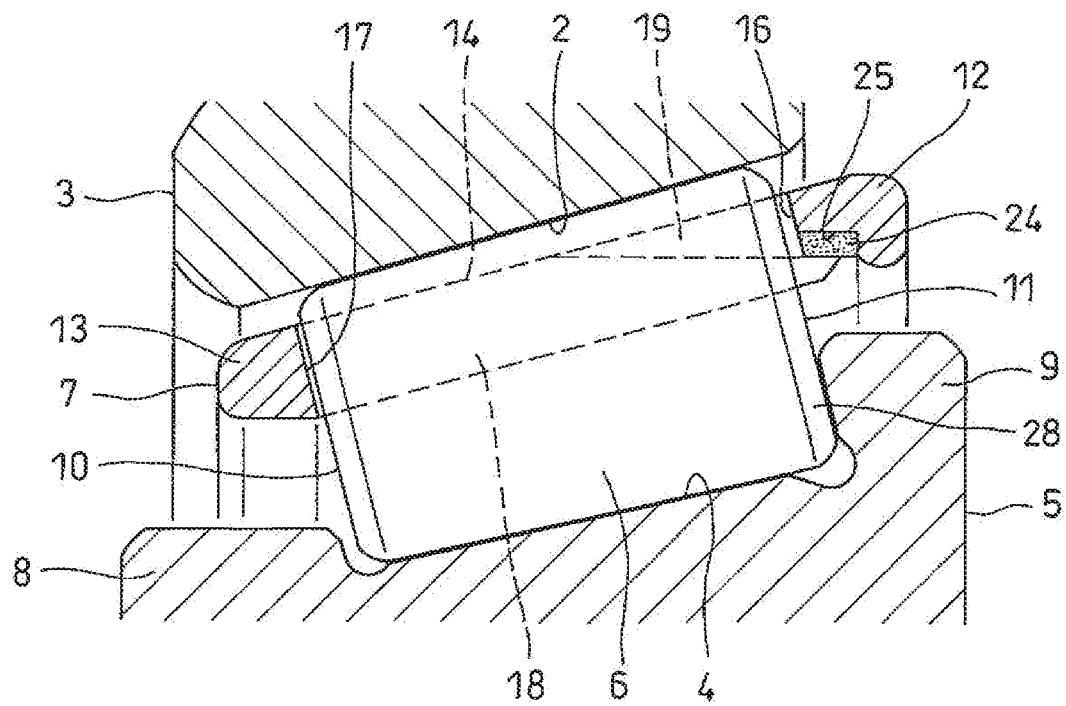
FIG. 21 is an enlarged sectional view of a tapered roller bearing in which a cage for a tapered roller bearing according to a Reference Example relating to the present invention is mounted, showing a tapered roller of the tapered roller bearing and its vicinity.

As illustrated in FIG. 21, the oil retaining recess 24 has an L-shaped inner surface with one end of the inner surface intersecting with the inner periphery of the large-diameter-side annular portion 12, and with the other end thereof intersecting with the large-diameter-side pocket surface 16. The portion 25 of the inner surface of the oil retaining recess 24, i.e., its portion facing radially inwardly of the cage 7 is inclined radially outwardly of the cage 7 toward the large end surface 11 of the tapered roller 6.

Figure 22:
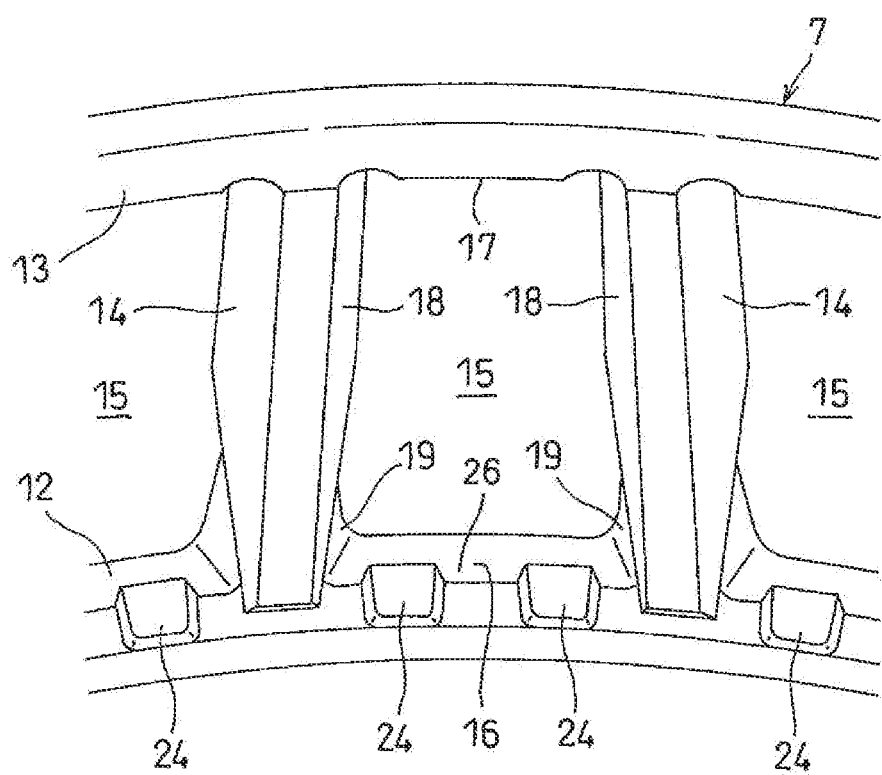
FIG. 22 is a partial perspective view of the cage of FIG. 21.

The number of the oil retaining recesses 24 per large-diameter-side pocket surface 16 may be three or more, but in Reference Example, as illustrated in FIG. 22, two such oil retaining recesses are formed in each large-diameter-side pocket surface 16, and the two oil retaining recess 24 are spaced apart from the center of the large-diameter side pocket surface 16 to the opposite sides of the center in the circumferential direction of the cage.

Figure 24:
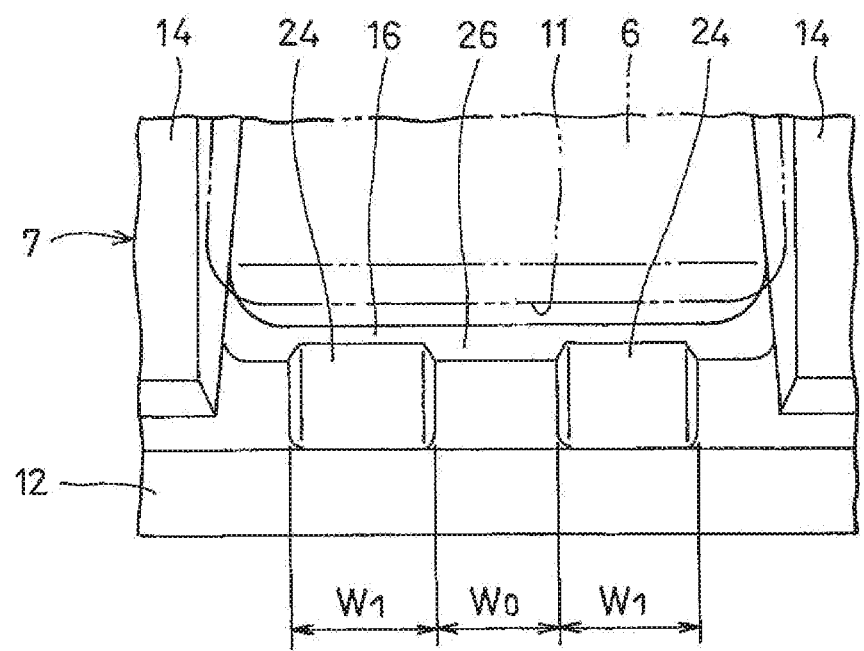
FIG. 24 is a view illustrating the oil retaining recesses of the cage of FIG. 22 and their vicinities, when the cage is seen from the radially inner side.

As illustrated in FIG. 24, the widths $W_1$ of the openings of the two oil retaining recess 24 in the circumferential direction of the cage (right-and-left direction in FIG. 24) are equal to or larger than the width $W_0$, in the circumferential direction of the cage, of the unopen section 26 between the two oil retaining recess 24. The unopen section 26 between the two oil retaining recesses 24 is a surface extending parallel to the large end surface 11 of the tapered roller 6. When the cage 7 axially moves, the unopen section 26 between the two oil retaining recess 24 comes into surface contact with the large end surface 11 of the tapered roller 6.

Figure 25:
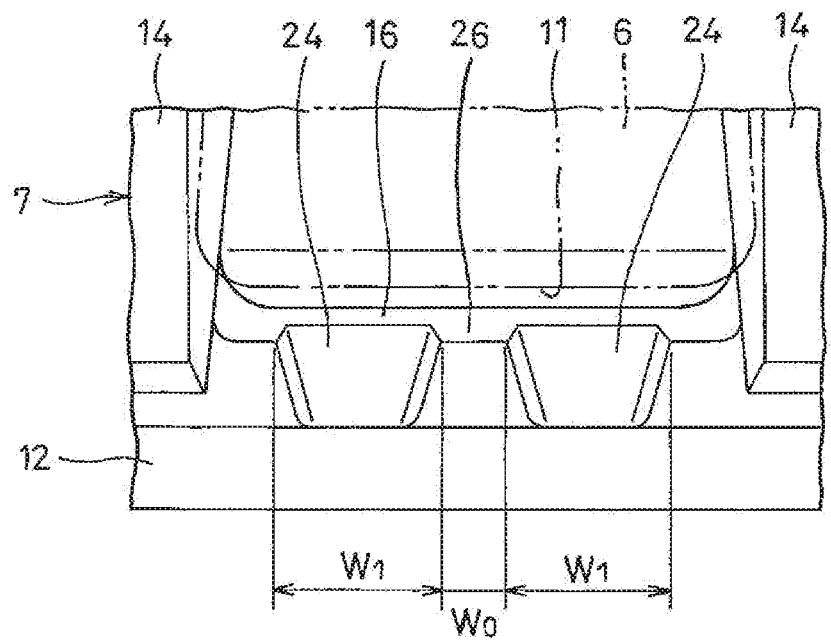
FIG. 25 is a view illustrating a variation of the oil retaining recesses of FIG. 24.

In the example of FIG. 24, the oil retaining recesses 24 are each straight-shaped such that the width of the oil retaining recess 24 between its inner surface portions opposed to each other in the circumferential direction of the cage is uniform in the axial direction of the cage 7 (vertical direction in FIG. 24). However, as illustrated in FIG. 25, each oil retaining recess 24 may be tapered such that the width of the oil retaining recess 24 between its inner surface portions opposed to each other in the circumferential direction of the cage gradually increases in the axial direction of the cage toward the large end surface 11 of the tapered roller 6. With this arrangement, it is possible to increase the volume of lubricating oil retained in the oil retaining recesses 24, and thus to effectively lubricate the large end surfaces 11 of the tapered rollers 6.

Figure 23:
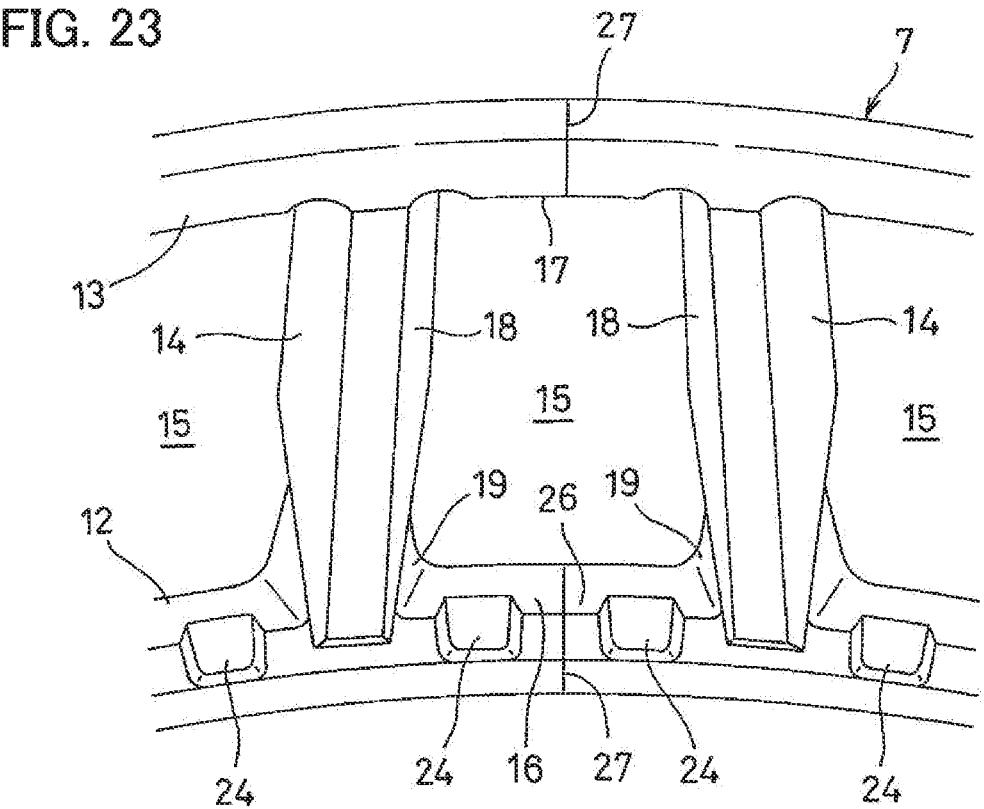
FIG. 23 is a view illustrating a weld line generated, in the cage of FIG. 22.

When integrally forming the large-diameter-side annular portion 12, the small-diameter-side annular portion 13, and the pillars 14 by resin molding during which a weld line or lines 27 form where the flows of resin meet, the resin molding is preferably performed such that, as shown in FIG. 23, the weld line or each of the weld line 27 is located on one of the unopen sections 26 between the respective pairs of the oil retaining recesses 24. In this way, compared to arrangements in which the weld line or lines 27 overlap with one or more of the oil retaining recesses 24, it is possible to form the oil retaining recesses 24 without markedly decreasing the strength of the cage, with the large-diameter-side annular portion 12 having a sufficient wall thickness.

Figure 26:
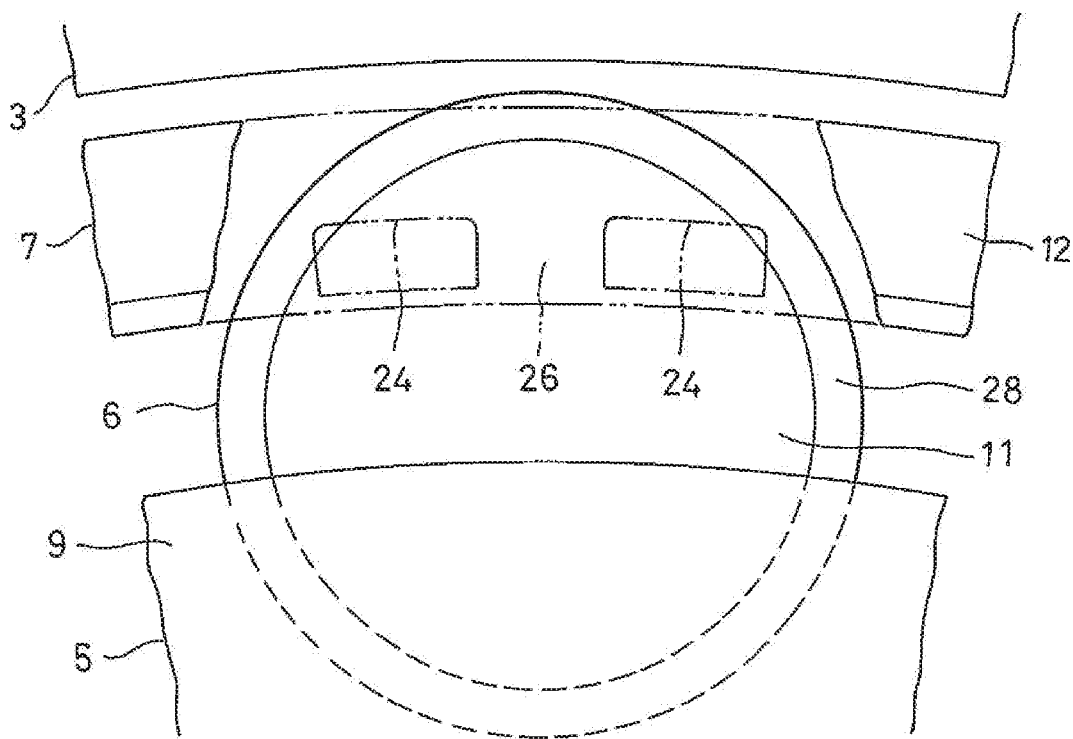
FIG. 26 is a view showing the large end surface of a tapered roller by partially removing the large-diameter-side annular portion of the cage to illustrate the positional relationship between the large end surface of the tapered roller and the oil retaining recesses of FIG. 21.

As illustrated in FIG. 26, each oil retaining recesses 24 is disposed such that, when seen in the axial direction of the corresponding tapered roller 6, a portion of the opening of the oil retaining recess 24 that accounts for 50% or more of the area of the opening is aligned with the large end surface 11 of the tapered roller 6. Here, the large end surface 11 refers to a surface portion of the tapered roller 6 located inwardly of a chamfer 28 disposed on the outer periphery of the tapered roller 6 at its large diameter end (in the example shown, the chamfer 28 is a rounded chamfer having a circular arc-shaped cross section).

Figure 27:
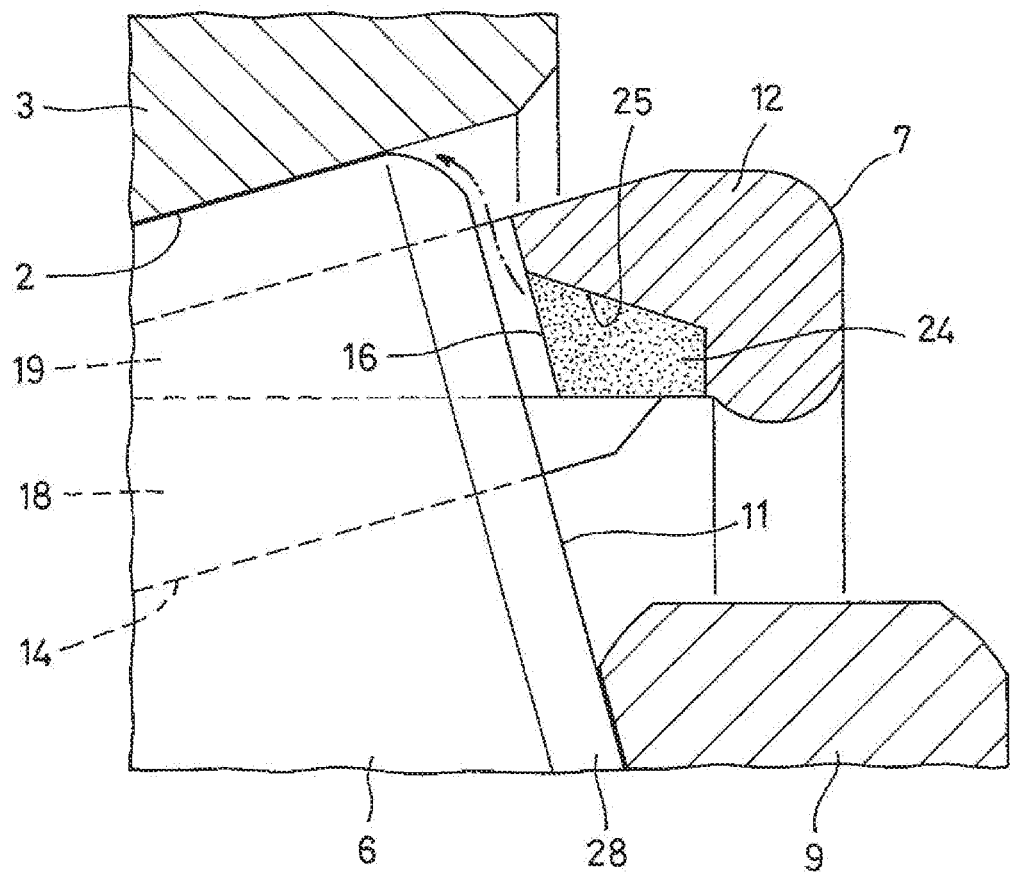
FIG. 27 is a view illustrating a variation of the oil retaining recess of FIG. 21.

As illustrated in FIG. 27, the portion 25 of the inner surface of each oil retaining recess 24, i.e., its portion facing radially inwardly of the cage 7 may be inclined radially outwardly of the cage 7 toward the large end surface 11 of the tapered roller 6. With this arrangement, when the tapered roller bearing 1 is started, lubricating oil in the oil retaining recess 24 flows, by centrifugal force, along the inclined inner surface portion of the oil retaining recess 24, toward the large end surface 11 of the tapered roller 6, thus effectively lubricating the large end surface 11 of the tapered roller 6.

The inclination angle of the portion 25 facing radially inwardly of the cage 7 relative to the axial direction of the cage is preferably 10 degrees or more (more preferably 12 degrees or more, still more preferably 15 degrees or more), because such inclination angle ranges increase the volume of lubricating oil retained in the oil retaining recess 24 when the bearing is stopped, and also enables the lubricating oil retained in the oil retaining recess 24 to flow easily by centrifugal force when the bearing is started.

Each pillar 14 of FIGS. 21 to 23 may have oil grooves 40 similar to those shown in FIGS. 9 and 10, or may have, in its end closer to the small-diameter-side annular portion 13, oil releasing cutouts 44 similar to those shown in FIGS. 11 and 12. Also, the cage 7 of FIGS. 21 to 23 may include an in extending flange 49 similar to the one shown in FIG. 13 such that the size δ of the gap between the inner diameter of the inwardly extending flange 49 and the outer diameter of the small flange 8 is 1.0% or less of the outer diameter of the small flange 8. Also, the small-diameter-side annular portion 13 of the cage 7 of FIGS. 21 to 23 may include, on its inner periphery, a plurality of circumferentially spaced apart protrusions 51 similar to those shown in FIGS. 16 and 17.

The Reference Example of FIGS. 21 to 27 discloses the invention described below:

Additional Description 1

A cage for a tapered roller bearing, the cage comprising:
a large-diameter-side annular portion (12) circumferentially extending along the large end surfaces (11) of a plurality of tapered rollers (6);

a small-diameter-side annular portion (13) circumferentially extending along the small end surfaces (10) of the tapered rollers (6); and a plurality of pillars (14) coupling together the large-diameter-side annular portion (12) and the small-diameter-side annular portion (13), wherein the large-diameter-side annular portion (12), the small-diameter-side annular portion (13) and the pillars (14) define a plurality of pockets (15) in which the respective tapered rollers (6) are received, and wherein the large-diameter-side annular portion (12) has large-diameter-side pocket surfaces (16) formed so as to be opposed to the large end surfaces (11) of the respective tapered rollers (6), characterized in that the large-diameter-side annular portion (12) includes, in each large-diameter-side pocket surface (16), a plurality of oil retaining recesses (24) formed to span the inner periphery of the large-diameter-side annular portion (12) and the large-diameter-side pocket surface (16).

Additional Description 2

The cage according to additional description 1, wherein each oil retaining recesses (24) has, on its inner surface, a portion (25) facing radially inwardly of the cage, and inclined radially outwardly of the cage toward the large end surface (11) of the tapered roller (6).

Additional Description 3

The cage according to additional description 1 or 2, wherein each oil retaining recesses (24) are tapered such that the width of the oil retaining recess (24) between its inner surface portions opposed to each other in the circumferential direction of the cage gradually increases toward the large end surface (11) of the tapered roller (6).

Additional Description 4

The cage according to any of additional descriptions 1 to 3, wherein each oil retaining recess (24) is disposed such that, when seen in the axial direction of the corresponding tapered roller (6), a portion of the opening of the oil retaining recess (24) that accounts for 50% or more of the area, of the entire opening is aligned with the large end surface (11) of the tapered roller (6).

Additional Description 5

The cage according to any of additional descriptions 1 to 4, wherein the oil retaining recesses (24) in each large-diameter-side pocket surface (16) are composed of two oil retaining recesses (24) spaced apart from the center of the large-diameter side pocket surface (16) to the opposite sides of the center in the circumferential direction of the cage.

Additional Description 6

The cage according to additional description 5, wherein the opening of each of the two oil retaining recesses (24) in each large-diameter-side pocket surfaces (16) has a first width ($W_1$) in the circumferential direction of the cage, and the unopen section between the two oil retaining recesses (24) has a second width ($W_0$) in the circumferential direction of the cage, wherein the first width ($W_1$) is equal to or larger than the second width ($W_2$).

Additional Description 7

The cage according to additional description 5 or 6, wherein the large-dimeter-side annular portion (12), the small-diameter-side annular portion (13), and the pillars (14) are integrally formed of a resin by resin molding during which a weld line or lines (27) from where the flows of resin meet, and wherein the resin molding is performed such that the weld line (27) or each of the weld lines (27) is located on the unopen section (26) between the two oil retaining holes (20) in one of the large-diameter-side pocket surfaces (16).

Additional Description 8

The cage according to additional description 7, wherein the resin is one of PPS, PA66, PA46 and PA9T.

Additional Description 9

The cage according to any of additional descriptions 1 to 8, wherein each pillar (14) has roller guiding surfaces (18) each configured to guide the conical outer peripheral surface of one of the tapered rollers (6), and an oil groove (40) is formed to extend through each roller guiding surface (18) in the axial direction of the cage such that one of two ends thereof in the axial direction of the cage opens to the outer n the radial direction of the cage) surface (41) of the pillar (14), and the other of the two ends thereof opens to the inner (in the radial direction of the cage) surface (42) of the pillar (14).

Additional Description 10

The cage according to any of additional descriptions 1 to 8, wherein each pillar (14) has roller guiding surfaces (18) each configured to guide the conical outer peripheral surface of one of the tapered rollers (6), and wherein a cutout (44) for releasing oil is disposed in the end of the pillar (14) closer to the small-diameter-side annular portion (13) so as to extend across each roller guiding surface (18) in the radial direction of the cage.

Additional Description 11

The cage according to additional description 10, wherein each pillar (14) has triangular recesses (45) formed to be integral with the respective cutouts (44), and extending from the respective cutouts (44) toward the large-diameter-side annular portion (12) such that the width of each triangular recess (45) in the radial direction of the cage gradually deceases toward the large-diameter-side annular portion (12).

Additional Description 12

The cage according to any of additional descriptions 1 to 11, wherein the pillars (14) are disposed radially outwardly of the pitch cone passing through the centers of the tapered rollers (6), and wherein the small-diameter-side annular portion (13) includes:

a coupling ring portion (48) coupling the pillars (14) together at positions radially outwardly of the pitch cone; and an inwardly extending flange (49) radially inwardly extending from the coupling ring portion (48).

Additional Description 13

A tapered roller bearing comprising:
an outer ring (3) having a conical outer ring raceway surface (2) on the inner periphery thereof;
an inner ring (5) having, on the outer periphery thereof, a conical inner ring raceway surface (4) located radially inwardly of, and opposed to, the outer ring raceway surface (2);
the above-mentioned plurality of tapered rollers (6) which are disposed between the outer ring raceway surface (2) and the inner ring raceway surface (4) so as to be circumferentially spaced apart from each other; and
the cage (7) according to any of additional descriptions 1 to 12, the cage (7) keeping the circumferential distances between the tapered rollers (6),
wherein the inner ring (5) includes:
a small flange (8) located on the small diameter side of the inner ring raceway surface (4); and
a large flange (9) configured to come into contact with the large end surfaces (11) of the tapered rollers (6).

Additional Description 14

The tapered roller bearing according to additional description 13, wherein the small-diameter-side annular portion (13) of the cage (7) includes, on the inner periphery thereof, a plurality of protrusions (51) formed so as to be circumferentially spaced apart from each other, such that the size (δ) of the gap between the incircle of the protrusions (51) and the outer diameter of the small flange (8) is 1.0% or less of the outer diameter of the small flange (8).

Additional Description 15

The tapered roller bearing according to additional description 14, wherein the protrusion (51) are ribs extending in the axial direction of the cage and each having a circular arc-shaped cross section.

Additional Description 16

The tapered roller bearing according to any of additional descriptions 13 to 15, wherein the large-diameter-side pocket surfaces (16) of the cage (7) are inclined relative to the direction perpendicular to the axial direction of the cage so as to face, while being oriented parallel to, the large end surfaces (11) of the respective tapered rollers (6).

The above-described embodiments are mere examples in every respect, and the present invention is not limited thereto. The scope of the present invention is indicated not by the above description but by the claims, and should be understood to include all modifications within the scope and the meaning equivalent to the scope of the claims.

DESCRIPTION OF REFERENCE NUMERALS

1: Tapered roller bearing
2: Outer ring raceway surface
3: Outer ring
4: Inner ring raceway surface
5: Inner ring
6: Tapered roller
7: Cage
9: Large flange
10: Small end surface
11: Large end surface
12: Large-diameter-side annular portion
13: Small-diameter-side annular portion
14: Pillar
15: Pocket
16: Large-diameter-side pocket surface
18: Roller guiding surface
20: Oil retaining hole
22: Portion facing radially inwardly of the cage
23: Portion facing radially outwardly of the cage
26: Unopen section
27: Weld line
40: Oil groove
41: Outer (in the radial direction of the cage) surface
42: Inner (in the radial direction of the cage) surface
44: Cutout
45: Recess
48: Coupling ring portion
49: inwardly extending flange
51: Protrusion
δ: Gap size

The invention claimed is:

1. A cage for a tapered roller bearing, the cage comprising:
a large-diameter-side annular portion circumferentially extending along large end surfaces of a plurality of tapered rollers;
a small-diameter-side annular portion circumferentially extending along small end surfaces of the tapered rollers; and
a plurality of pillars coupling together the large-diameter-side annular portion and the small-diameter-side annular portion,
wherein the large-diameter-side annular portion, the small-diameter-side annular portion and the pillars define a plurality of pockets in which the respective tapered rollers are received,
wherein the large-diameter-side annular portion has large-diameter-side pocket surfaces formed thereon so as to be opposed to the large end surfaces of the respective tapered rollers,
wherein the large-diameter-side pocket surfaces have oil retaining holes formed therein, the oil retaining holes comprising blind holes, and being configured to receive and retain lubricating oil by capillary action, and
wherein each of the pillars has roller guiding surfaces each configured to guide a conical outer peripheral surface of one of the tapered rollers, and a cutout for releasing oil is formed in an end of the pillar closer to the small-diameter-side annular portion so as to extend across each of the roller guiding surfaces in a radial direction of the cage.

2. The cage according to claim 1, wherein the oil retaining holes each has, on an inner surface of the oil retaining hole, a portion facing radially inwardly of the cage, and inclined radially outwardly of the cage toward the large end surface of a corresponding one of the tapered rollers.

3. The cage according to claim 2, wherein the oil retaining holes each has, on the inner surface of the oil retaining hole, a portion facing radially outwardly of the cage, and inclined radially inwardly of the cage toward the large end surface of the corresponding one of the tapered rollers.

4. The cage according to claim 1, wherein each of the oil retaining holes is tapered such that a width of the oil retaining hole between inner surface portions of the oil retaining hole opposed to each other in a circumferential direction of the cage gradually increases toward the large end surface of a corresponding one of the tapered rollers.

5. The cage according to claim 1, wherein each of the oil retaining holes is disposed such that, when seen in an axial direction of a corresponding one of the tapered rollers, a portion of an opening of the oil retaining hole that accounts for 50% or more of an area of the entire opening is aligned with the large end surface of the corresponding one of the tapered rollers.

6. The cage according to claim 1, wherein, of all the oil retaining holes, two oil retaining holes are formed in each of the large-diameter-side pocket surfaces so as to be spaced apart from a center of the large-diameter side pocket surface to opposite sides of the center of the large-diameter side pocket surface in a circumferential direction of the cage.

7. The cage according to claim 6, wherein an opening of each of the two oil retaining holes in each of the large-diameter-side pocket surfaces has a first width in the circumferential direction of the cage, and an unopen section between the two oil retaining holes has a second width in the circumferential direction of the cage, and wherein the first width is equal to or larger than the second width.

8. The cage according to claim 1, wherein each of the pillars has roller guiding surfaces each configured to guide a conical outer peripheral surface of one of the tapered rollers, wherein an oil groove is formed to extend through each of the roller guiding surfaces in an axial direction of the cage such that a first of two ends of the oil groove in the axial direction of the cage opens to an outer surface of the pillar, and a second of the two ends of the oil groove opens to an inner surface of the pillar, and wherein the outer surface of the pillar is outward in the radial direction of the cage and the inner surface of the pillar is inward in the radial direction of the cage.

9. The cage according to claim 1, wherein each of the pillars has triangular recesses each formed so as to be integral with one of the cutouts, and extending from the one of the cutouts toward the large-diameter-side annular portion such that a width of the triangular recess in the radial direction of the cage gradually deceases toward the large-diameter-side annular portion.

10. The cage according to claim 1, wherein the pillars are disposed radially outwardly of a pitch cone passing through centers of the tapered rollers, and
wherein the small-diameter-side annular portion includes:
a coupling ring portion coupling the pillars together at positions radially outward of the pitch cone; and
an inwardly extending flange extending radially inwardly from the coupling ring portion.

11. A tapered roller bearing comprising:
an outer ring having a conical outer ring raceway surface on an inner periphery of the outer ring;
an inner ring having, on an outer periphery of the inner ring, a conical inner ring raceway surface located radially inwardly of, and opposed to, the conical outer ring raceway surface;
the cage according to claim 1; and
the plurality of tapered rollers which are mounted between the conical outer ring raceway surface and the conical inner ring raceway surface so as to be circumferentially spaced apart from each other,
wherein the cage keeps circumferential distances between the tapered rollers, and
wherein the inner ring includes:
a small flange located on a small diameter side of the conical inner ring raceway surface; and
a large flange configured to come into contact with the large end surfaces of the tapered rollers.

12. The tapered roller bearing according to claim 11, wherein the small-diameter-side annular portion of the cage has an inner periphery on which a plurality of protrusions are formed so as to be circumferentially spaced apart from each other, such that a size of a gap between an in circle of the protrusions and an outer diameter of the small flange is 1.0% or less of the outer diameter of the small flange.

13. The tapered roller bearing according to claim 12, wherein the protrusions are ribs extending in an axial direction of the cage and each having a circular arc-shaped cross section.

14. The tapered roller bearing according to claim 11, wherein the large-diameter-side pocket surfaces of the cage are inclined relative to a direction perpendicular to an axial direction of the cage so as to face, while being oriented parallel to, the large end surfaces of the respective tapered rollers.

15. A cage for a tapered roller bearing, the cage comprising:
a large-diameter-side annular portion circumferentially extending along large end surfaces of a plurality of tapered rollers;
a small-diameter-side annular portion circumferentially extending along small end surfaces of the tapered rollers; and
a plurality of pillars coupling together the large-diameter-side annular portion and the small-diameter-side annular portion,
wherein the large-diameter-side annular portion, the small-diameter-side annular portion and the pillars define a plurality of pockets in which the respective tapered rollers are received,
wherein the large-diameter-side annular portion has large-diameter-side pocket surfaces formed thereon so as to be opposed to the large end surfaces of the respective tapered rollers,
wherein the large-diameter-side pocket surfaces have oil retaining holes formed therein, the oil retaining holes comprising blind holes, and being configured to receive and retain lubricating oil by capillary action,
wherein, of all the oil retaining holes, two oil retaining holes are formed in each of the large-diameter-side pocket surfaces so as to be spaced apart from a center of the large-diameter side pocket surface to opposite sides of the center of the large-diameter side pocket surface in a circumferential direction of the cage, and
wherein the large-diameter-side annular portion, the small-diameter-side annular portion, and the pillars are integrally formed of a resin by resin molding during which a weld line or weld lines form where flows of resin meet, and wherein the weld line or each of the weld lines is located on an unopen section between the two oil retaining holes in one of the large-diameter-side pocket surfaces.

16. The cage according to claim 15, wherein the oil retaining holes each has, on an inner surface of the oil retaining hole, a portion facing radially inwardly of the cage, and inclined radially outwardly of the cage toward the large end surface of a corresponding one of the tapered rollers.

17. The cage according to claim 15, wherein the oil retaining holes each has, on an inner surface of the oil retaining hole, a portion facing radially outwardly of the cage, and inclined radially inwardly of the cage toward the large end surface of a corresponding one of the tapered rollers.

18. The cage according to claim 15, wherein each of the oil retaining holes is tapered such that a width of the oil retaining hole between inner surface portions of the oil retaining hole opposed to each other in the circumferential direction of the cage gradually increases toward the large end surface of a corresponding one of the tapered rollers.

19. The cage according to claim 15, wherein each of the oil retaining holes is disposed such that, when seen in an axial direction of a corresponding one of the tapered rollers, a portion of an opening of the oil retaining hole that accounts for 50% or more of an area of the entire opening is aligned with the large end surface of the corresponding one of the tapered rollers.

20. The cage according to claim 15, wherein an opening of each of the two oil retaining holes in each of the large-diameter-side pocket surfaces has a first width in the circumferential direction of the cage, and the unopen section between the two oil retaining holes has a second width in the circumferential direction of the cage, and wherein the first width is equal to or larger than the second width.

* * * * *